US006259218B1

(12) United States Patent
Kovach et al.

(10) Patent No.: US 6,259,218 B1

(45) Date of Patent: Jul. 10, 2001

(54) BATTERY-POWERED WIRELESS REMOTE-CONTROL MOTORIZED WINDOW COVERING ASSEMBLY HAVING A MICROPROCESSOR CONTROLLER

(75) Inventors: Joseph E. Kovach, Thornton; Michael S. Holford, Broomfield; Gary F. Skinner, Westminster; Marek Jarosinski, Brighton; Erwin Gaudyn, Westminster; David Vogel, Thornton; Wendell B. Colson, Boulder, all of CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 0 days.

(21) Appl. No.: 09/692,491

(22) Filed: Oct. 20, 2000

Related U.S. Application Data

(63) Continuation of application No. 09/532,011, filed on Mar. 21, 2000, now Pat. No. 6,181,089, which is a continuation of application No. 09/357,761, filed on Jul. 21, 1999, now Pat. No. 6,057,658, which is a continuation of application No. 09/131,417, filed on Aug. 10, 1998, now Pat. No. 5,990,646, which is a continuation of application No. 08/757,559, filed on Nov. 27, 1996, now Pat. No. 5,793,174.

(60) Provisional application No. 60/025,541, filed on Sep. 6, 1996.

(51) Int. Cl.[7] .............................. A47H 5/032; H04Q 9/14

(52) U.S. Cl. ............................ 318/16; 318/266; 318/480; 388/907.5; 388/933

(58) Field of Search .............................. 318/16, 264, 265, 318/266, 283, 286, 466, 467, 468, 480; 388/907.5, 933; 49/25

(56) References Cited

U.S. PATENT DOCUMENTS 4,618,804 10/1986 Iwasaki .
4,644,990 2/1987 Webb, Sr. et al. .
4,706,726 11/1987 Nortoft .
4,712,104 12/1987 Kobayashi .
4,727,918 3/1988 Schroeder .
4,773,464 9/1988 Kobayashi .
4,852,627 8/1989 Peterson et al. .
4,856,574 8/1989 Minami et al. .
4,878,528 11/1989 Kobayashi .
4,913,214 4/1990 Ming .
4,956,588 9/1990 Ming .
5,029,428 7/1991 Hiraki .
5,038,087 8/1991 Archer et al. .
5,134,347 7/1992 Koleda .
5,142,133 8/1992 Kern et al. .
5,170,108 12/1992 Peterson et al. .
5,247,655 * 9/1993 Khan et al. .......................... 395/550
5,274,499 12/1993 Shopp .
5,345,424 * 9/1994 Landgraf .............................. 365/227
5,391,967 2/1995 Domel et al. .
5,444,339 8/1995 Domel et al. .

(List continued on next page.)

FOREIGN PATENT DOCUMENTS

96/21286 7/1996 (WO) .

*Primary Examiner*—Bentsu Ro
(74) *Attorney, Agent, or Firm*—Pennie & Edmonds LLP

(57) ABSTRACT

A wireless battery-operated window covering assembly is disclosed. The window covering has a head rail in which all the components are housed. These include a battery pack, an interface module including an IR receiver and a manual switch, a processor board including control circuitry, motor, drive gear, and a rotatably mounted reel on which lift cords wind and unwind a collapsible shade. The circuitry allows for dual-mode IR receiver operation and a multi-sensor polling scheme, both of which are configured to prolong battery life. Included among these sensors is a lift cord detector which gauges shade status to control the raising and lowering of the shade, and a rotation sensor which, in conjunction with internal registers and counters keeps track of travel limits and shade position.

52 Claims, 17 Drawing Sheets

U.S. PATENT DOCUMENTS

| | | | | |
|---|---|---|---|---|
| 5,495,153 | | 2/1996 | Domel et al. . | |
| 5,517,094 | | 5/1996 | Domel et al. . | |
| 5,603,371 | | 2/1997 | Gregg . | |
| 5,630,090 | * | 5/1997 | Keehn et al. | 395/433 |
| 5,642,022 | | 6/1997 | Sanz et al. . | |
| 5,675,487 | | 10/1997 | Patterson et al. . | |
| 5,698,958 | | 12/1997 | Domel et al. . | |
| 5,714,855 | | 2/1998 | Domel et al. . | |
| 5,729,103 | | 3/1998 | Domel et al. . | |
| 5,818,183 | | 10/1998 | Lambert et al. . | |
| 5,909,093 | * | 6/1999 | Van Dinteren et al. | 318/16 |

* cited by examiner

BATTERY-POWERED WIRELESS REMOTE-CONTROL MOTORIZED WINDOW COVERING ASSEMBLY HAVING A MICROPROCESSOR CONTROLLER

RELATED APPLICATIONS

This is a continuation of Ser. No. 09/532,011, filed Mar. 21, 2000, now U.S. Pat. No. 6,181,089, which is a continuation of Ser. No. 09/357,761, filed Jul. 21, 1999, now U.S. Pat. No. 6,057,658, which is a continuation of Ser. No. 09/131,417, filed Aug. 10, 1998, now U.S. Pat. No. 5,990,646, which is a continuation of Ser. No. 08/757,559, filed Nov. 27, 1996, now U.S. Pat. No. 5,793,174, which claims priority to provisional application No. 60/025,541, filed Sep. 6, 1996.

TECHNICAL FIELD

This invention relates to electrically powered window coverings such as vertically adjustable shades, tiltable blinds and the like. More particularly, the invention relates to motorized window coverings which are activated by a wireless remote control transmitter and have associated with them a DC motor and electrical and mechanical circuitry adapted to store position information.

BACKGROUND

Wireless, remote control, motorized window coverings are activated by a control signal generated and sent by a transmitter. As explained in U.S. Pat. No. 4,712,104 to Kobayashi, the control signal is usually converted into one of audio, radio (RF), or light (either visible or, more preferably, infrared (IR)) energy, and transmitted through the air. When a button on a remote transmitter is pushed, the control signal comprising one of these types of energy is generated. The control signal sent by the transmitter may comprise a carrier signal which modulates either a continuous waveform or, more preferably, a sequence of spaced apart pulses. In those cases where spaced apart pulses are used, the pulses may either be coded, or they may comprise a sequence of pulses having substantially identical pulse widths and a constant pulse repetition frequency (PRF).

Each wireless, remote control motorized window covering system is provided with at least one transducer which converts the transmitted energy into electrical signals. In the case of an audio signal, the transducer is a microphone. In the case of RF signal, the transducer is likely to be an antenna, which may comprise an electromagnetic coil tuned to the carrier frequency. Finally, in the case of a light signal, the transducer is typically a photodiode, a photoresistor or a phototransistor.

As the signal travels from the transmitter to the transducer, it may become slightly corrupted. For instance, in the case of an acoustic signal, environmental noise in frequencies of interest, may be added to the signal. In the case of a light signal, light from other sources may be added to the received signal. Further corruption may take place as the transmitted signal is converted by the transducer into an electrical signal. This is because all transducers, however precise, cannot output an electrical signal which perfectly replicates the incoming transmitted signal. Usually, the electrical signal from the transducer will vary slightly from what was transmitted.

In addition to being corrupted, the signal may have also been modulated before transmission, as explained above. Together, these factors result in a signal that is distorted, and may be unintelligible to a decision circuit, described further below. To help correct some of this distortion, the electrical signal from the transducer is usually preprocessed before it is interpreted by a decision circuit. The goal of this preprocessing is to convert the electrical signal from the transducer to a form that can be used, and is less likely to be misinterpreted, by the decision circuit. This process is loosely referred to as "cleaning up" the signal.

Cleaning up a signal from a transducer may involve filtering and demodulating a signal, as is often necessary with RF and IR signals. It may also involve waveshaping using comparators, inverters and triggers which have hysteresis-like input/output relationships, as disclosed in U.S. Pat. No. 5,275,219 and Canadian Patent No. 1,173,935 to Yamada, both of which are directed to motorized window systems which respond to daylight. In the case of IR signals, an integrated IR receiver, having a photodiode or a phototransistor, signal amplifiers, bandpass filters, demodulators, integrators and hysteresis-like comparators for waveshaping, perform such a function. The IS1U60, available from Sharp Electronics, is such a receiver, and can be used in remote control operations.

As stated above, in a remote control system, the cleaned up control signal is presented to a decision circuit. The role of the decision circuit is to determine a) whether the cleaned up control signal is valid, i.e., whether or not the signal content is such that the system should respond, and b) what, if any, response should be taken, in view of the control signal content and other status information.

The decision circuit comprises additional sensors, switches and registers, which keep track of such things as the direction of last motion, the position of the window covering relative to its travel extremes, and other status information. The decision circuit may be formed entirely from a combination of discrete analog and digital components, in which case the decision circuit is said to be hardwired. Alternatively, the decision circuit may include a microprocessor, microcontroller, or equivalent, in which case the decision circuit is said to be programmable. As is known to those skilled in the art, incorporating a microprocessor, or the like, allows for more complex decision making with the control signals and other status information.

All decision making circuits, whether or not they incorporate a microprocessor, are connected to a motor circuit adapted to drive a DC motor. Although the exact implementation of a motor circuit may differ, they all serve to connect the source of power, be it a battery, a solar cell, or even an AC-to-DC transformer, to the motor to operate the window covering. A typical motor circuit is disclosed in U.S. Pat. No. 4,618,804 to Iwasaki. In this circuit, two signals from the drive circuit are used to activate a pair of transistors. In such a motor circuit, upon receipt of an "UP" motor signal from the decision circuit, current flows from the voltage source, through a first transistor, the motor, and a second transistor to drive the motor in a first direction (e.g., clockwise). And, upon receipt of a "DOWN" motor signal, current flows from the voltage source through a third transistor, the motor, and a fourth transistor to drive the motor in an opposite direction (e.g., counterclockwise).

The power supply for a motorized window covering system may originate from an alternating current (AC) source, as shown in U.S. Pat. No. 3,809,143 to Ipekgil. In such case, one plugs into a wall socket and a transformer, or the like, is used to convert the AC into DC. As an alternative to using an AC power source, the power supply may comprise a battery, which may be recharged by a solar cell and/or by plugging into an AC source. U.S. Pat. No. 4,664,169 to Osaka discloses such a battery-operated lift system which moves a bottommost supporting slat relative to a headrail.

In wireless, remote-controlled motorized systems having an AC power source, there is little concern about designing the system to minimize energy consumption. This is because the AC source provides, for all practical purposes, virtually unlimited power. On the other hand, when a battery, especially one that cannot be recharged, is used, the current draw of the system becomes a design concern. This is because the transducer must always be available to receive a transmitted control signal. Also, the preprocessing, decision making and motor drive circuitry must be prepared to respond immediately, which usually means that they are, at the very least, in a "standby mode", which also draws at least some current.

In the case of battery powered systems, there are three general approaches to conserving battery power. One approach is to use low-power, discrete analog and digital components which are on at all times, whether or not a valid control signal is received. This is the approach taken in U.S. Pat. No. 5,495,153 to Domel et al., which calls for using low dark-current phototransistors, and low-power logic devices such as NAND gates, counters, flip flops, power saving resistors, and the like. A second approach is to cycle one or more components on and off while waiting for a valid signal. This is the approach taken in U.S. Pat. No. 5,134,347 to Koleda, which calls for turning an IR receiver on for a brief period of time, and then allowing it continue to stay on longer if it receives a valid signal. The approach taken in Koleda is based on well-settled techniques for reducing the duty cycle of a receiver powered by a battery, as disclosed in U.S. Pat. No. 4,101,873 to Anderson et al. Finally, the third approach of conserving battery power is to use a solar cell to continuously recharge the batteries. U.S. Pat. No. 4,644,990 to Webb discloses a photosensitive energy conversion element which recharges batteries used to supply power to automatic system for tilting blinds.

To operate a window covering, the motor is typically placed in a headrail where it is hidden from view. A rod, to which the motor is operatively engaged, is rotatably mounted in the headrail. When the rod rotates, cords connected at one end to the rod, and also connected to the shade or blinds, can be wound either directly on the rod or on a spool arranged to turn with the rod in a lift system. U.S. Pat. No. 4,550,759 to Archer shows such a system for controlling the tilt of a blind, and U.S. Pat. No. 4,856,574 to Minami shows a motorized system for controlling the lift of a horizontal slat.

The extent of travel for a window covering can be limited by a counter, which uses dead reckoning to keep track of the number of rotations of the motor or the rod, relative to a stored counter value. In such case, the rotating wheel, or the like interrupts an optical or a magnetic path, and these interruptions are counted. Such systems are shown in the aforementioned Minami '574 reference.

As an alternative to "dead reckoning", limit switches may be used to control the extent of movement of the window covering. Limit switches are mechanical switches which are activated by engagement with a member of the system during the latter's operation. In the typical case, the limit switches are stationary and are abutted by a movable member of the motorized system. U.S. Pat. No. 4,727,918 to Schroeder discloses the use of limit switches in the headrail to control the tilt of a blind. Along similar lines, Danish Patent No. 144,894 to Gross discloses the use of limit switches in the headrail to control the lift of a shade.

It should be noted here that we have used the word "shade" to generically describe a window covering which could be raised and lowered. This word encompasses such window coverings as venetian blinds comprising horizontal slats, pleated shades, accordion shades, and the like. As is known to those skilled in the art, pleated and accordion shades are typically formed from a lightweight fabric, and thus are often lighter than the more rigid slats. Because of this, it is generally accepted that mechanisms having sufficient torque to raise and lower horizontal slats, can also raise and lower lightweight shades.

Finally, in the typical remote control motorized system, the transducers, circuitry, motors, and servo mechanisms used to operate one type of window covering, can often be adapted to operate other types. For instance, as explained in International Publication WO 90/03060 to Roebuck, a motor/servo arrangement capable of opening and closing vertical slats and also drawing them, can readily be adapted to venetian blinds (horizontal slats) and the like. Similarly, EPO 381,643 to Archer shows that a DC motor mounted in headrail and connected to rotatably mounted rod can lift horizontal slats or pleated shades with virtually no modifications.

The prior art also includes systems which combine a large number of the features discussed above. For instance, there are wireless, remote-control lift systems having a headrail-mounted DC motor which winds a lift cord around a rod, and which has additional novel features. One such example is the battery-powered device of U.S. Pat. No. 5,029,428 to Hiraki, which is placed between the panes of a double-pane window. Another, is the IR-controlled, AC-powered, microprocessor-based device of Japanese Laid-open application 4-237790 to Minami, which provides for a programmable lower limit for the shade using the transmitter.

SUMMARY OF THE INVENTION

The present invention provides a battery-powered, wireless, remote-control, microprocessor-driven, motorized window covering assembly having the batteries, motor, drive gear, a rotatably mounted reel around which is lift cord is wound for raising and lowering a shade, circuitry and sensors, all housed in a headrail, making the resulting device more visually appealing.

One aspect of the invention is that the assembly's circuitry is configured to prolong the life of the batteries. In this regard, the IR receiver is alternately turned on and off in one of two power states which differ only in the length of the on-off power cycle. Peripheral sensors are also operated only on an as-needed basis, under microprocessor control to further prolong battery life. These sensors, along with flags, timers and registers controlled by the microprocessor, are arranged to restrict motor operation under inappropriate conditions, thereby both prolonging battery life and preventing damage to the assembly.

Another aspect of the present invention is that the assembly having a detector which engages the lift cord to determine when the shade has either been fully lowered, or alternatively, has met with an obstruction, the detector being used to control both the downward movement of the shade, and also the upper limit of shade travel, in conjunction with a remote control transmitter.

Yet another aspect of the present invention is a resilient, vibration dampening bushing which mounts the motor onto the head rail, thereby reducing vibrations transferred to the head rail and also to the rod. This not only helps dissipate energy imparted to the headrail, but also reduces annoying acoustic noise.

DESCRIPTION OF THE PREFERRED EMBODIMENT

Figure 1:
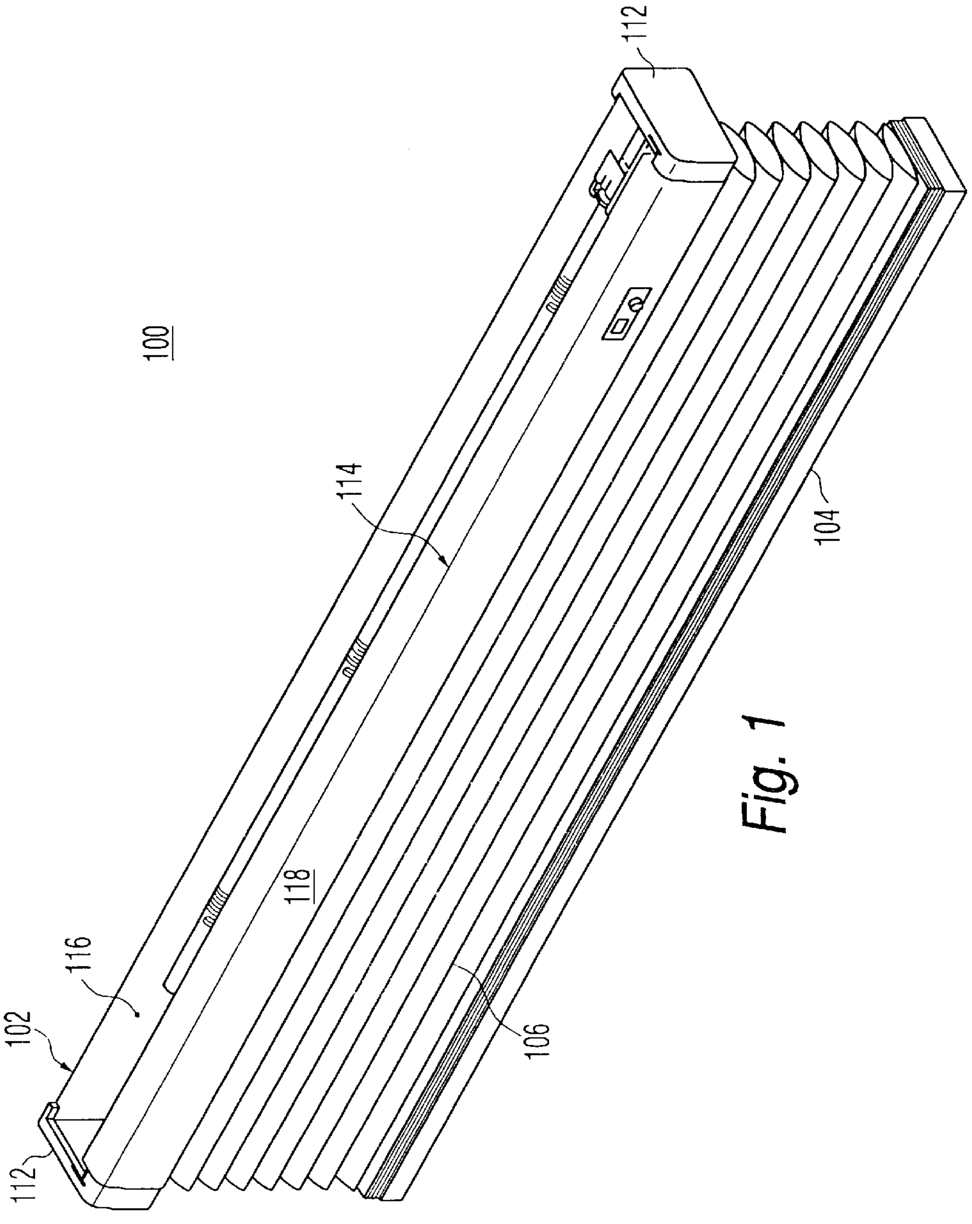
FIG. 1 is a perspective view of a window covering assembly in accordance with the present invention.

FIG. 1 shows a window covering assembly 100 of the present invention. The assembly comprises a head rail 102, a bottom rail 104, and a shade 106. Preferably, the head rail 102 and bottom rail are formed from aluminum, plastic, or some other light weight materials. The shade 106 shown FIG. 1 is an expandable and contractible covering preferably made from a light fabric, paper, or the like. The shade of FIG. 1 is shown to be a cellular honeycomb shade; however, a pleated shade, horizontal slats, and other liftable coverings can also be used.

Figure 2:
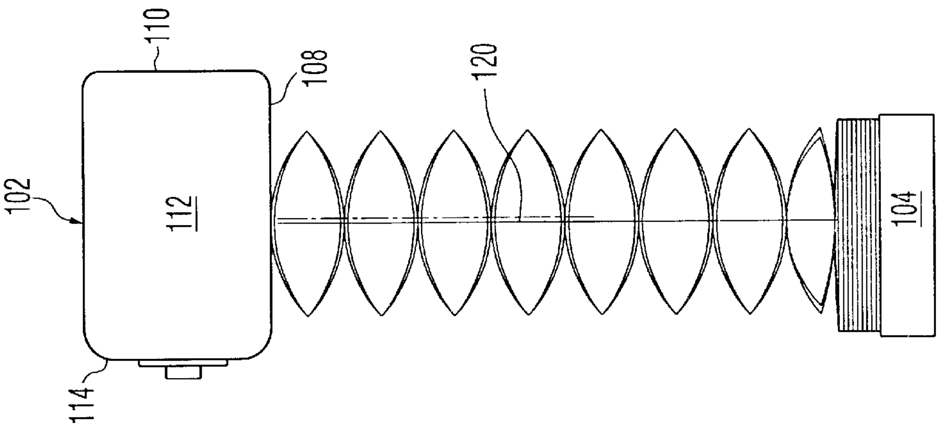
FIG. 2 is an end view of the assembly shown in FIG. 1.

As seen in FIGS. 1 and 2, the head rail 102 comprises a bottom panel 108, a back panel 110, end caps 112 and a front panel 114. The front panel 114 is hinged by pins, attached at its upper end corners, to the end caps 112. This facilitates access to the cavity 116 within the head rail 102 behind the front panel's front surface 118. Alternatively, the front panel 114 can be hinged to the bottom member 108, or even be fully removable and snapped on to the rest of the head rail.

A plurality of lift cords 120 descend from within the head rail 102, pass through the cells of the honeycomb shade 106, to the bottom rail where they are secured by known means. The weight of the bottom rail 104 and shade 106 are supported by the lift cords 120, causing the latter to normally undergo tension.

Figure 3:
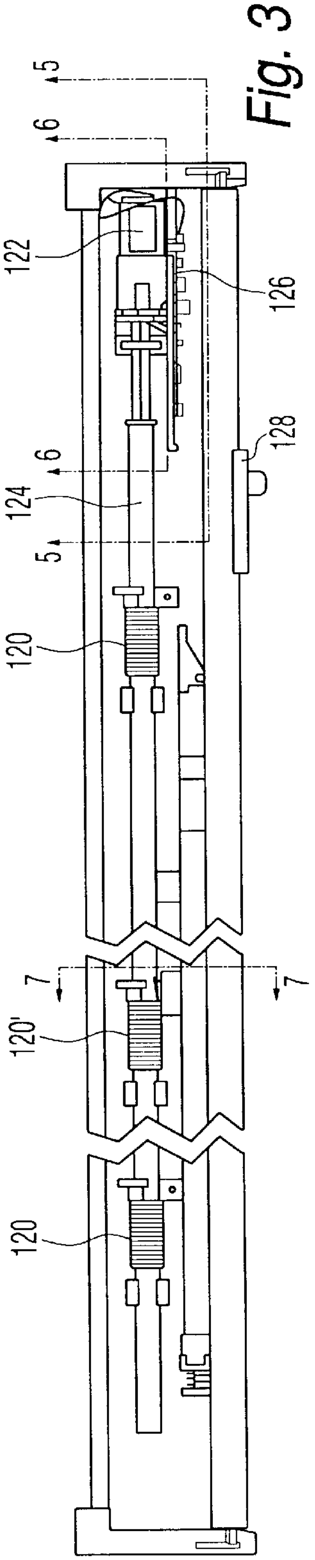
FIG. 3 is a top view of the head rail.

FIG. 3 shows a top view of the cavity 116. Within the cavity 116 are an elongated tube 150 forming a battery pack which houses batteries 152 and is mounted on the cavity-facing side of the front panel 118. The tube 150 is preferably formed from a non-conductive material such as plastic. Also mounted in the cavity is a motor 122 operatively engaged to a rotatably mounted reel shaft 124, around which reel shaft the lift cords 120 are wound and unwound. Preferably, the reel shaft is hollow to reduce its weight. This reduces the torque and power requirements, thus extending battery life. A printed circuit (PC-) board 126 which carries much of the electronic circuitry of the assembly is also housed in the cavity.

Figure 4:
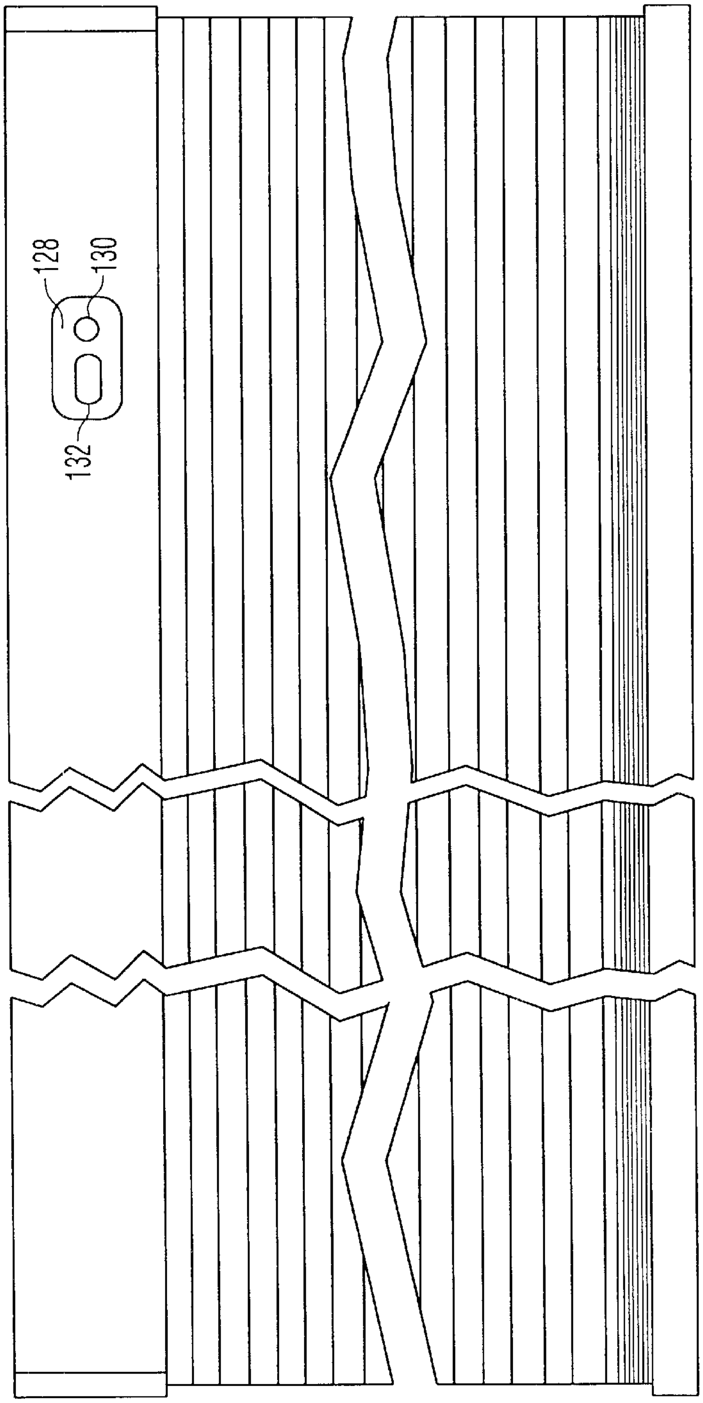
FIG. 4 is a partially foreshortened front view of the assembly.
Figure 5:
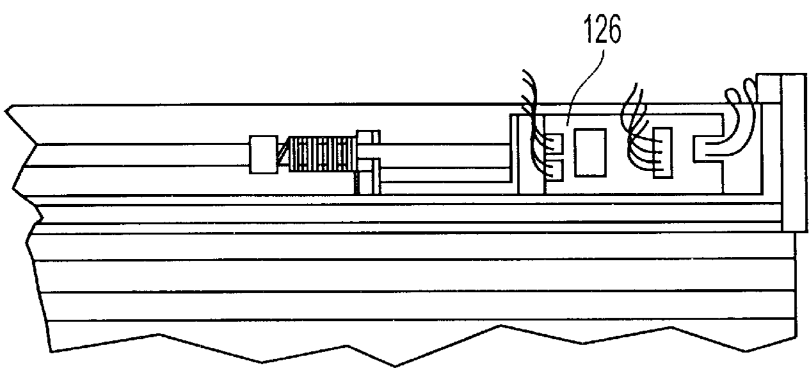
FIG. 5 is a sectional view taken along line 5—5 in FIG. 3.

As best seen in FIGS. 3 and 4, an interface module 128 communicates between the front surface 118 and the cavity 116. The interface module 128 comprises an infrared (IR) receiver and a manual switch 130. On the front surface 118, the manual switch 130 and a daylight-blocking window 132 are visible. The manual switch 130 can be activated by a user at any time. The window 132 covers the photoreceiver (i.e., transducer) of the IR receiver and helps extend the life of the batteries by preventing daylight from needlessly activating the transducer. One skilled in the art would recognize that an IR receiver, whose transducer has a built-in daylight-blocking window or a daylight-blocking coating, may also be used. The important thing is that the transducer not respond to daylight, and preferably be arranged such that it only responds to infrared light. It should be noted that the shade has no manually operated pull cord. Thus, the manual switch 130 on the front panel, and the IR receiver are normally the only means for operating the window covering.

Figure 6:
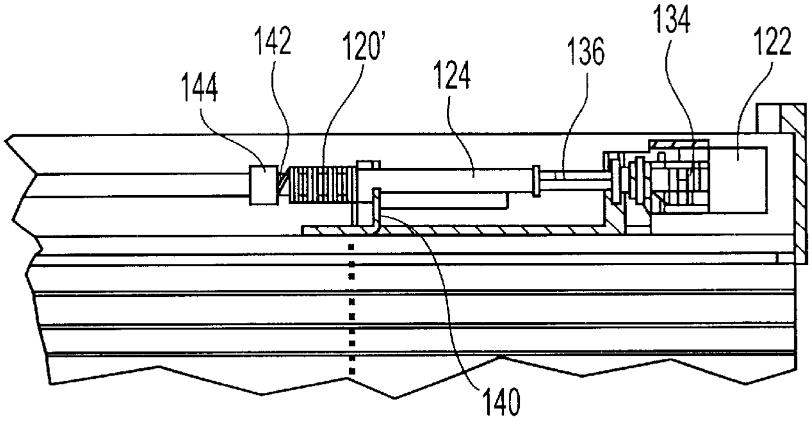
FIG. 6 is a sectional view taken along line 6—6 in FIG. 3.

As shown in FIG. 6, the motor 122 and its transmission 134 are operatively connected to a drive rod 136 having a square cross-section. The drive rod 136 is received by a telescoping reel shaft 124 which turns in spaced-apart bearings 138, each integrally formed with a reel support 140. When the drive rod 136 turns, the reel shaft 124 turns and also telescopes in an axial direction, one rotation of the reel shaft corresponding to an axial movement approximately equal to the thickness of the lift cord 120'. Thus, the lift cord passes through the bottom plate of the head rail at substantially the same position as it winds and unwinds. Thus, as seen in FIG. 6, the lift cord 120' is wrapped around the reel shaft 124, each turn abutting its neighbor without overlap, and its end 142 secured to the reel shaft by a ring-shaped clamp 144.

Figure 7:
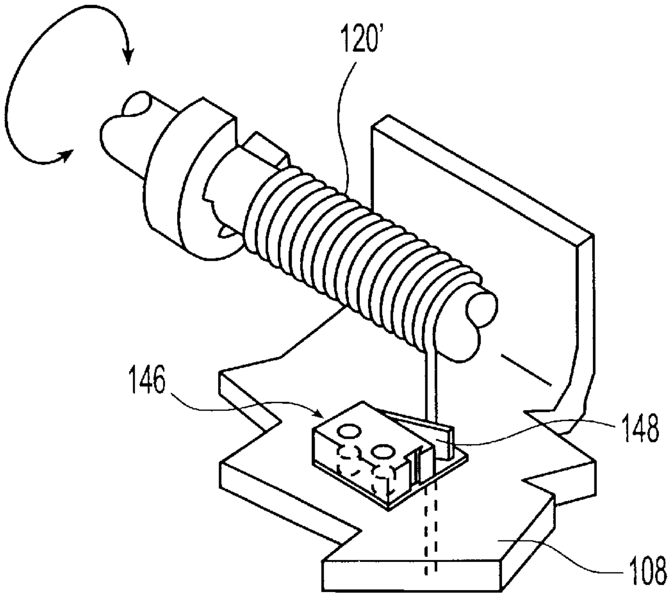
FIG. 7 is a perspective view of the lift cord which engages the reed switch.

FIG. 7 illustrates the significance of having a particular lift cord 120' pass through the bottom panel 108 at the same position, as it winds and unwinds. A lift cord detector 146, formed as a reed switch, is mounted on the inside surface of the bottom panel 108. The lift cord detector 146 is positioned such that the lift cord 120' abuts the detector's reed 148, when there is tension in the lift cord 120'. When it abuts the reed 148, the lift cord 120' closes a connection in the switch. In the present design, the detector's reed 148 must be in abutment with the cord 120' for the motor 122 to lower the shade.

There are two situations of interest in which the detector's reed 148 no longer abuts the lift cord 120' during descent, causing the motor to stop. The first is when the tension in the lift cord 120' is relaxed. This happens, for example, when the bottom rail 104 meets with an obstruction, such a person's hand or an object on a window sill. In this first situation, the function of the lift cord detector 146 is to monitor the tension in the cord 120'.

The second situation is when the descending shade fully unwinds the lift cord 120'. In this latter case, as the reel shaft 124 makes its final rotation, it comes to a stop after bringing the end 142 of the lift cord 120' past the reed 148 and thus, no longer in abutment therewith. In such case, the lift cord 120' hangs from the reel shaft 124 in a position that is laterally displaced from the position it occupied when it was wrapped around the reel shaft 124. In this second situation, the function of the cord detector 146 is to gauge the lateral position of the lift cord 120' as it hangs from the reel 124.

It should be noted that the function of gauging the lateral position of the lift cord may be performed a number of equivalent means. For instance, if the lift cord is thick enough, an optical sensor comprising an LED and a photodetector may suffice. The lift cord 120' would then obstruct the light path in a first lateral position, and would not obstruct the light path in a second lateral position. And if the lift cord 120' is formed from a metallic material, it may also be possible to arrange a magnetic sensor to detect a lateral movement of the lift cord 120'. Such sensors, however, would require power to operate, and would not be able to simultaneously detect tension; therefore, they are not preferred.

Figure 8:
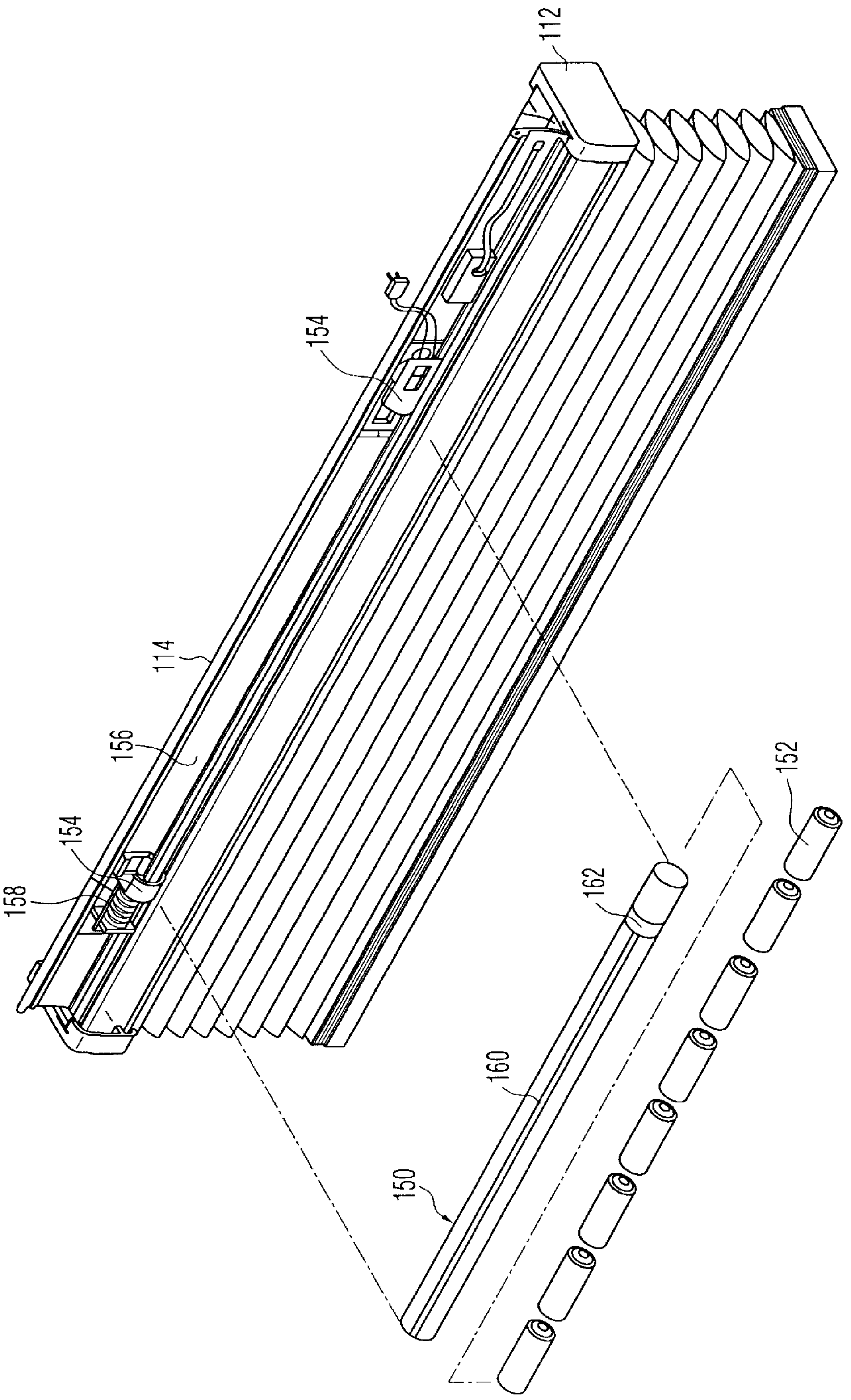
FIG. 8 is a perspective view of the assembly of FIG. 1, with the front panel raised.

As shown in FIG. 8, the power supply for the assembly of the present invention is a battery pack 150 comprising eight 1.5V AA batteries 152. The batteries, which preferably are non-rechargeable, are laid end-to-end, in electrical series with one another, thus providing 12 volts. The batteries are housed in a single elongated tube 150 which is mounted via brackets 154 fixed to the back side 156 of the head rail's front panel 114. With the batteries 152 laid end-to-end and substantially parallel to the reel shaft 124, substantially space savings is realized. This allows the motor, rotatable reel shaft, battery-based power supply, and electronics to be held within a housing having a cross-section less than 1¾"by 1¾".

A coil spring 158 mounted on the back side 156 biases a first end of the elongated tube 150, forcing a positive battery terminal against a positive electrical contact positioned at the opposite, second end. A conductor strip 160 formed on an outer surface of the tube 150 connects the negative terminal of the battery pack 150 to a ring-shaped negative electrical contact 162. Leads from each contact ultimately provide an electrical connection from the battery pack 150 to the PC board 126, motor 122 and module 128.

Figure 9:
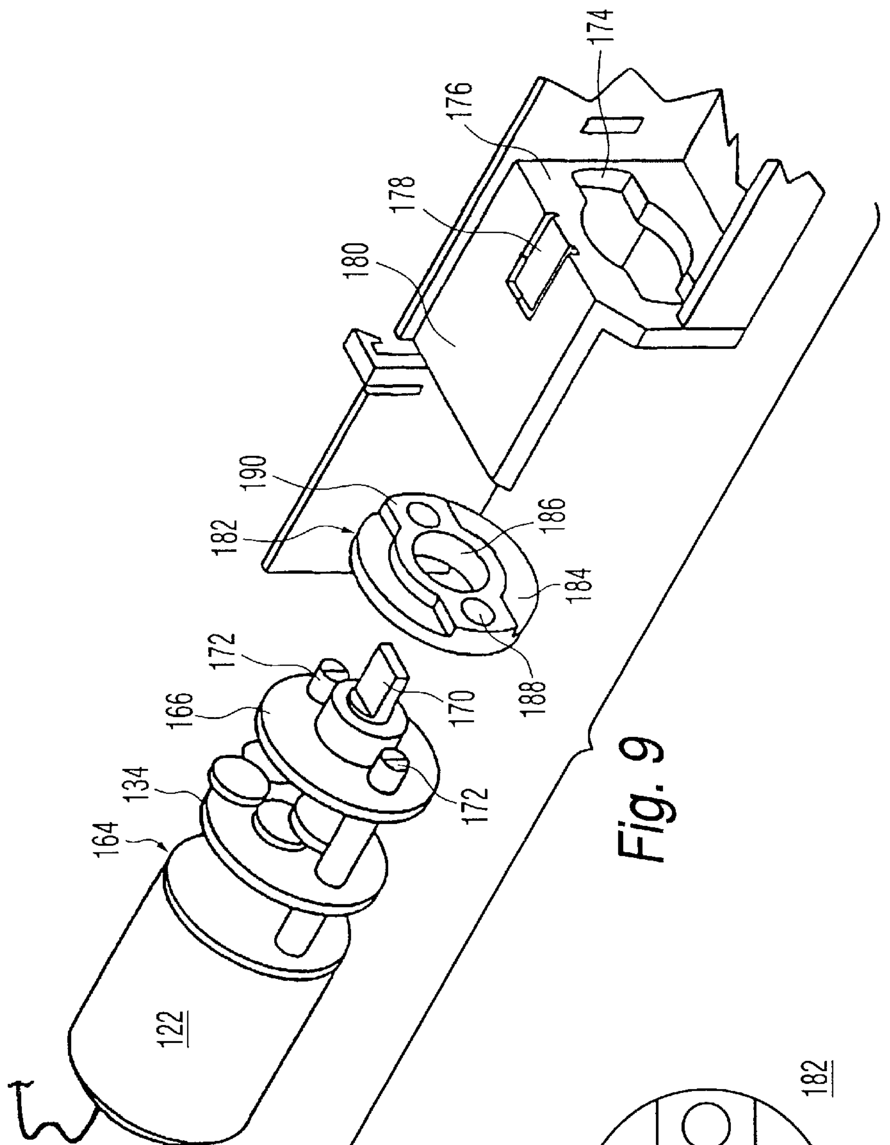
FIG. 9 is an enlarged perspective view of the motor and transmission assembly and mounting therefor.
Figure 11:
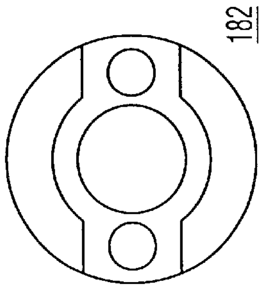
FIG. 11 is a front elevation view of the mounting bushing shown in FIG. 10.
Figure 10:
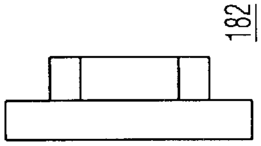
FIG. 10 is a side elevation view of the mounting bushing shown in FIG. 9.

As depicted in FIG. 9, the motor 122 and its associated transmission 134 are assembled as a drive unit 164, along with a protective drive plate 166. The drive plate 166 is formed with an annular boss 168 through which the drive coupling 170 protrudes. A pair of diametrically opposed pins 172 secure the drive plate 166, transmission 134 and motor 122 to each other. This facilitates assembly of the hardware within the head rail.

The drive unit 164 is mounted in an elongated aperture 174 formed in a bulkhead 176. The bulkhead itself is rigidly fixed to the floor of head rail, on the inside surface of the latter's bottom panel 108. Clips 178 formed on a bulkhead top panel 180 help retain the drive unit 164.

As the bulkhead 176 is rigidly fixed to the head rail, any eccentricity in the motor 122 and drive unit 164 is transferred, in the form of vibrations, to the entire head rail 102. This vibration is amplified by the head rail, causing the latter to emit annoying noises. To reduce vibrations imparted to the bulkhead 176 by the drive unit 164, a resilient vibration dampening bushing 182 is used to mate the drive unit to the bulkhead. The bushing 182, which preferably is formed from neoprene rubber having a Shore A hardness of between 60–70, has a substantially cylindrical base member 184. The base member 184 is provided with a central aperture 186 shaped and sized to receive the annular boss 168 formed on the drive plate 166, and is further provided with a pair of apertures 188 adapted and positioned to receive the pins 172. On one side of its cylindrical base 184, the bushing 178 is provided with an elongated boss 190 integrally formed therewith. The elongated boss is shaped and sized to be received by the elongated aperture 174 in the bulkhead. In this manner, the bushing 182 both supports the drive unit 164 within the head rail, and also provides vibration dampening to reduce motor noise during operation of the window covering 30.

Figure 12:
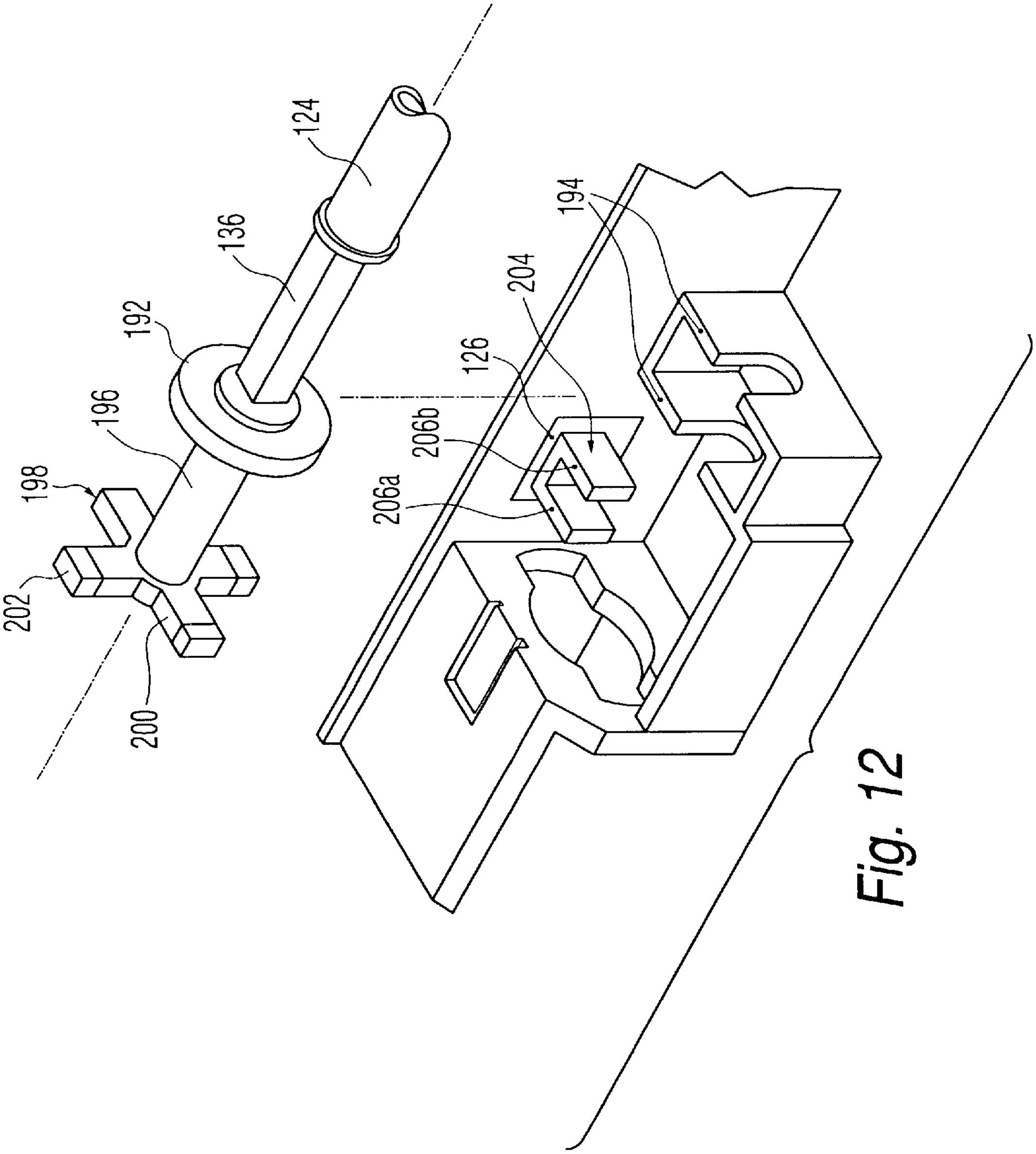
FIG. 12 is a perspective view of a drive rod including a counter wheel.

As shown in FIG. 12, one end of the drive rod 136 is integrally formed with a flange 192. Preferably they are formed from a hard plastic, or the like. The flange 192 is rotatably mounted between a pair of upstanding ribs 194 supported on the inside surface of the head rail's bottom panel. The ribs prevent the drive rod 136 from moving in an axial direction as it is turned. One end of drive shaft 196 is connected to the drive rod 136 at the flange 192. The opposite end of the drive shaft 196 is adapted to engage the transmission coupling 170 at a point between the bulkhead 176 and the flange 192. Thus, coupling 170, drive shaft 196, flange 192 and drive rod 136 all turn together when the motor is operated.

Mounted on the drive shaft 196 is a star wheel 198, which has four equidistantly spaced, radial spokes 200. The star wheel 198 turns with the drive shaft 196 and the spokes interrupt a path between two objects, represented by 206*a,* 206*b*. As the star wheel turns, the number of such interruptions is counted by a rotation counter. This number can then be translated into the number of revolutions of the reel shaft 124 relative to some starting point. The value in the rotation counter may then be used to compare with an upper or a lower limit count value saved in a memory register.

Either magnetic or optical sensing may be used in conjunction with the spokes 200. For magnetic sensing, a permanent magnet 202 is attached, by adhesive or equivalent means, to the radially outward end of each spoke 200. A magnetic sensor 204 comprising a pair of spaced apart sensor bars 206*a,* 206*b* is mounted on the underside of the PC-board 126. As the star wheel 198 turns with the drive shaft, its magnet-tipped spokes 200 pass between the sensor bars. The number of resulting magnetic disturbances is then counted, and this number is used in the position determination.

Alternatively, instead of a magnetic sensor, an optical sensor may be used. In such case, a light emitting diode (LED) 206*a,* arranged to emit light having a narrow wavelength, is positioned on one side of the star wheel 198. A phototransistor 206*b* responsive to that wavelength is positioned on the other. The LED and phototransistor are used to count interruptions by the spokes, as disclosed in U.S. Pat. No. 4,856,574 to Minami, whose contents are incorporated by reference in their entirety.

In the present invention, to extend battery life, the magnetic sensor, or, alternatively, the LED and phototransistor, are powered and monitored only when the motor is running. More specifically, they are powered just an instant before the motor is activated, and they are turned off just after the motor stops running.

Figure 13:
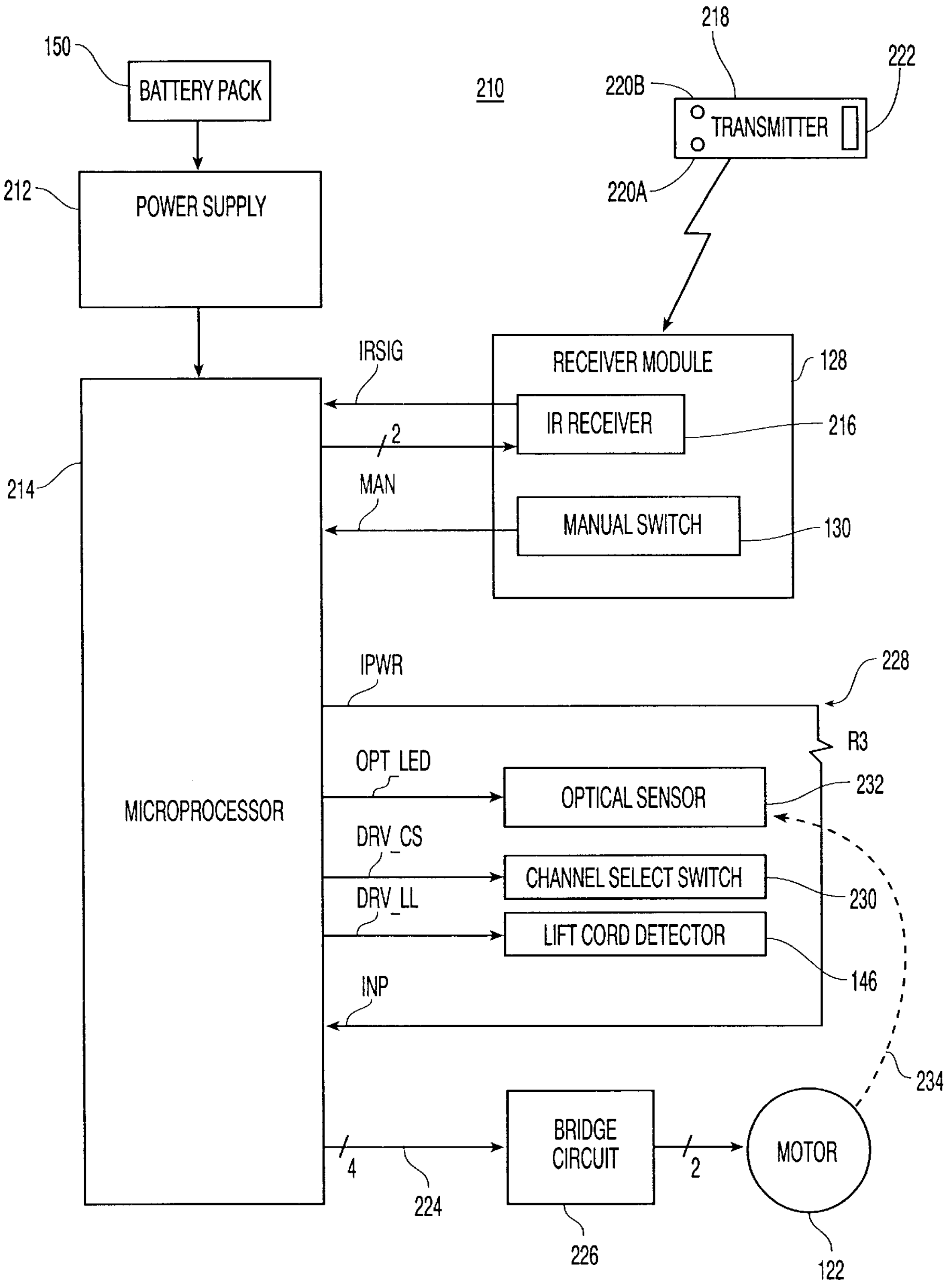
FIG. 13 is a block diagram of a control circuit utilized in the present invention.

FIG. 13 presents a block diagram of the circuit 210 used to control the shade 106. The battery pack 150 supplies all power to the circuit 210 via a power supply 212. Power supply 212 provides battery protection, noise filtering and voltage regulation. It also outputs a 12 volt supply to power the motor, and a 5 volt supply to power the rest of the circuit.

The heart of the circuit is a microprocessor 214, part no. 16C54. This processor is advantageous in that any port pin can be used for input or output. Also, an output port can put out a 5 volt signal capable of driving 25 mA of current. Thus, the processor itself acts as a low-current power supply of sorts. The processor is provided with a central processing unit, a non-volatile read-only memory (ROM), and a random access read-write memory (RAM). The ROM stores executable program code which is automatically entered upon booting the circuit by connecting the batteries. Alternatively, if a POWER ON switch is provided, this code is entered when such a switch is activated. The RAM includes a number of memory locations used for maintaining position data, status data, signal flags and the like. To extend battery life when there is no activity, the processor is cycled between a quiescent state and a sleep state. A built-in watchdog timer wakes up the processor from the sleep state. In the quiescent state, the processor 214 check a manual switch 130 and an IR receiver 216 to see if there are any inputs to which it should respond. If there are, the processor then enters an active state to process the input and take any other necessary action in response thereto. Upon conclusion of the active state, the processor is returned to the sleep state, after which the quiescent/sleep cycle is resumed.

The processor 214 is connected to the interface module 128. A 5 volt power line, IRSIG, and a ground connection are supplied by the processor to the interface module 128. Two signal lines, one from the manual switch 130, MAN, and another from the IR receiver 216, IRSIG, are returned to the processor.

The manual switch 130 can be either a contact switch, which activates a motor only when it is being depressed. Alternatively, switch 130 can be a single throw switch, which is activated once to start the motor, and activated a second time to stop the motor, unless, the motor stops by itself for some other reason. Either type of switch can be used, so long as the microprocessor 214 is appropriately programmed. Regardless of which type of switch is used, the switch output is presented on line MAN and this is read by the processor 214.

In the preferred embodiment, an IR transmitter 218 having separate UP **220*a* and DOWN 220*b* buttons is used to remotely activate the shade. The IR transmitter is also provided with a two-position channel selection switch 222**, which allows a user to choose between two channels, A and B. The channel selection feature is especially advantageous in rooms where more than one window covering assembly is to be installed.

When either the UP or the DOWN button is pushed, a coded sequence of pulses corresponding to the button pushed and the channel selected, is generated. This sequence comprises a command signal. Each sequence has an identical number of pulses, and the sequence is repeated as long as the button is depressed. Each pulse in a sequence has a predetermined width of between 0.8 and 2.8 msec and is modulated with a 38 kHz carrier before being transmitted.

In the preferred embodiment, the IR receiver is a TFMS 5.0, available from TEMIC Telefunken. It filters and demodulates the sensed command signal and outputs a sequence of pulses corresponding to that generated within the transmitter 218 before being modulated. These pulses are output on line IRSIG and are read by the processor 214 by sampling to determine the length of each pulse. After reading the incoming sequence, the processor 214 matches it against a reference sequence stored in ROM. If a match occurs, the processor then sends out the appropriate signals to energize the motor, if other conditions are met.

To extend the life of the battery, the IR receiver 216 is cycled on and off by the processor 214 in one of two power cycle modes, a first, “look” mode, and a second, “active” mode. With no sensor activity and the motor off, the receiver 216 is normally in the look mode. In the look mode, power to the receiver 216 is alternatingly turned off for about 300 msecs, and then turned back on for about 7.1 msec. This means that, on average, a user must depress a transmitter button for about ⅓ second before any response can be expected. During the 7.1 msecs in which the receiver is powered, the processor checks the receiver output every 33 μsecs to see if a valid pulse, i.e., one between 0.8 and 2.8 msecs, has been received. Whether or not one has been received, the receiver 216 is turned off.

If no valid pulse has been received, the receiver is allowed to remain in the look mode. If, however, the microprocessor determines that a valid pulse was received, it then shifts the receiver into the active mode. In this mode, the receiver remains off for 9.5 msecs, and then is turned on for about 46 msecs, and a new alternating cycle of 9.5 msecs off and 46 msecs on, is established. When it is in the active mode, the receiver's output is checked by the processor every 160 μsecs. In the active mode, valid pulses, and even valid sequences of pulses (i.e., those sequences capable of activating the motor), may be received and interpreted by the processor 214.

If neither a valid pulse, nor a valid sequence is received in that first 46 msec period of the active mode, the processor shifts the receiver back to the look mode beginning with the next off cycle. If, instead, a valid sequence is received, the processor 214 and associated circuitry turn on the motor 122, and the receiver is allowed to remain in the active mode as long as the motor is running. Thus, with the motor running, the receiver is cycled off for 9.5 msecs and on for 46 msecs. Once the motor stops, whether due to a transmitted signal, or due the shade 106 reaching either an upper or a lower travel limit, or an obstruction, the receiver is shifted back into the look mode.

It should be noted that the above times are nominal values; actual times may vary by as much as 25%, depending on what other inputs the processor receives. It should also be noted that if the receiver output is continuously low for a predetermined number of cycles, e.g., 10 cycles, the receiver is considered to be in saturation. In such case, the processor shifts the receiver to the active mode to clear this situation.

In summary, then, the receiver 216 is switched between one of two power cycle modes. Both transmitted signals and motor status determine when the receiver is switched between the two modes. In a given mode, the length of time for which the receiver is turned on in each power-on, power-off cycle, is substantially the same. Also, the length of time for which power is continuously connected to the IR receiver 216 is independent of the content of the data received during that connection period. Thus, even if a valid pulse is received during a power-on period, power to receiver will be disconnected at the end of that period. This differs from the aforementioned U.S. Pat. No. 5,134,347 to Koleda, whose contents are incorporated by reference in their entirety, wherein power to the receiver is continued if a valid signal is received in the look mode.

To activate the motor 122, four control lines 224 are connected between the processor 214 and a bridge circuit 226. Two of the four control lines are connected to base terminals of a pair of NPN bipolar junction transistors (BJTs), each of which serves as a switch to control one half of the bridge circuit 226. The remaining two control lines are connected to the gate terminals of a pair of low power field effect transistors (MOSFETs). Each of the MOSFETs forms the lower portion of one half of the bridge circuit 226, allowing current to flow through its corresponding half when that FET's gate is activated by the processor 214.

The circuit 210 includes a sensor subcircuit 228 which gathers status information from one of three different sensors. The microprocessor powers the sensor subcircuit 228 at predetermined times through line IPWR, which is connected to resistor R3, and reads the sensor output through line INP. To read a particular sensor, it must first be enabled through a dedicated line DRV__CS, DRV__LL and OPT__LED from the processor 214.

One of the three sensors is a channel select strap 230. The channel select strap 230 allows a user to enable the processor 214 to match a received command signal only with stored sequences corresponding to the selected channel. Preferably, the channel select strap 230 can be accessed either from outside the head rail or by simply opening its hinged front panel 114. The channel select strap can be formed as a simple wire or a jumper connector connecting two pins or leads. Alternatively, it can be formed as a two-position switch, much like the channel selector 222 on the transmitter 218. When the wire or jumper connector is intact, the processor 214 will try to match received command signals with stored sequences corresponding to channel A. And when the wire or jumper connector is not in place, e.g, when the wire is cut or the jumper connector is removed, the processor tries to match received command signals with stored sequences corresponding to channel B.

To determine which channel has been selected, the processor 214 powers the sensor subcircuit 228 using line IPWR, enables the channel select strap using line DRV__CS, and reads the input on line INP. In normal use, the channel selector strap 230 is only examined (i.e., IPWR and DRV__CS are both activated and INP is monitored) upon power start-up. As stated above, power start-up takes place when the batteries are first connected or when the power switch is activated, if a power switch is provided. Thereafter, if the channel select strap 230 is altered to designate a different channel, the processor 214 will continue to match received sequences only against stored sequences corresponding to the previous channel. Thus, after changing the channel select strap, the power must first be turned off before the processor 214 will recognize sequences corresponding to the newly directed channel.

One skilled in the art will recognize that the channel select strap 230 may be configured to allow one to select from among more than two channels. This can be done, for instance, by using a plurality of jumper connectors or a dip switch, or other device, which allows only one channel to be designated at a time. In such case, the processor 214 must connect an enable line, similar to DRV__CS, to each of these channel selection connectors and selectively activate them upon start-up. Alternatively, the processor 214 may output a set of coded enable lines which are then connected to a multiplexer, and from there to each of the channel selection connectors. If a plurality of channels are provided, the processor 214 must also store UP and DOWN sequences for each of these channels, and these sequences must include enough pulses to uniquely code for the chosen number of channels. Finally, the transmitter 218 should be provided with a multi-position switch or dial, allowing it to select from among the various channels and output corresponding UP and DOWN sequences. Such a configuration can allow a single transmitter to selectively control a plurality of shades.

The second sensor monitored by the processor 214 is the lift cord detector 146, discussed above. To determine whether the lift cord 120' is abutting the lift cord detector 146, the processor 214 powers the sensor subcircuit 228 using line IPWR, enables the lift cord detector 146 using line DRV__LL, and reads the input on line INP. It should be noted that current to the motor does not flow through the lift cord detector 146; only a current and voltage sufficient to be detected by the processor 214 is necessary.

The third sensor monitored by the processor 214 is used to count the number of interruptions made by the star wheel 198, and thus indirectly count the number of revolutions that the drive shaft 196 turns. As represented by the dashed line 234 from the motor 122 to the sensor 232, motor rotation is indirectly coupled to the sensor 232 in this manner. In the preferred embodiment, the third sensor 232 is an electro-optic sensor 232, although a magnetic sensor may also be used, as explained above. The electro-optic sensor creates a light path which is interrupted by the star wheel 198. The sensor 232 comprises a light emitting diode LED1 and a phototransistor PT1. As the motor 122 turns, so does the star wheel 198, and the interruptions of the star wheel affect the output of the phototransistor PT1.

As explained above, the electro-optic sensor 232 operates only when the motor is just about to run and continues to operate so long as the motor is running. Thus, to activate the electro-optic sensor 232, the processor powers the sensor subcircuit using line IPWR, enables the light emitting diode LED1 using line OPT__LED and reads the input on line INP. Each time the star wheel 198 interrupts the path between LED1 and PT1, this interruption is sensed by the processor on line INP.

Thus, when the motor is just about to run, and also while the motor is running, the processor 214 powers the sensor subcircuit 228. It then periodically enables the cord detector 146 with line DRV__LL and reads the input on line INP, and also periodically enables LED1 and reads the input on INP.

In this manner, the microprocessor monitors these sensors with a single sensor input line. After power startup, only the lift cord detector 146 and the optical sensor 232 are monitored. And even these two are monitored only if the processor has been directed to turn on the motor 122 asked to turn on by either the transmitter 218 or by the manual switch 130.

Figure 14:
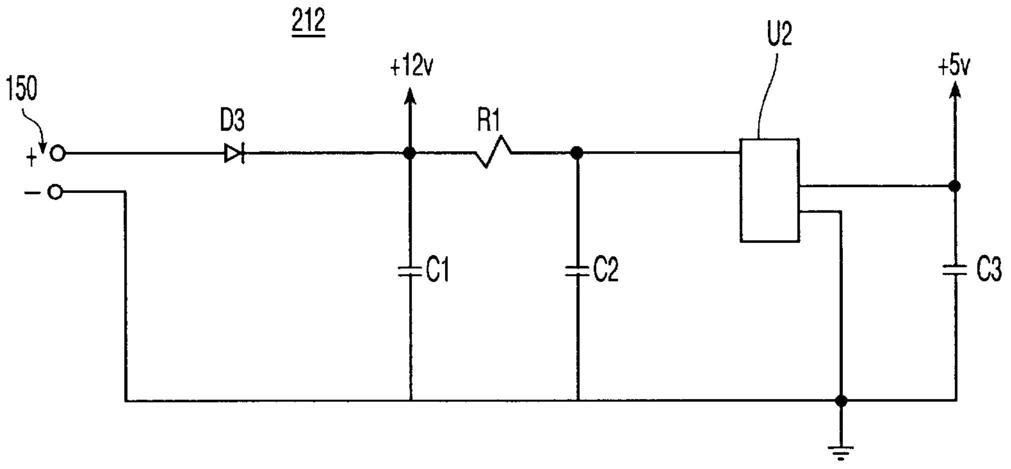
FIG. 14 is a circuit diagram of the power supply of FIG. 13.

FIG. 14 presents a circuit diagram of the power supply. Power is supplied by the battery pack 150. Diode D3 provides battery reversal protection. The power supply provides a 12 volt source to drive the motor and a 5 volt source to drive the remainder of the circuit. A voltage regulator U2, which has a quiescent current of about 1 $\mu$A, is always on, providing a 5 volt source. Capacitors C1 and C2 and resistor R1 filter motor noise connected to the 12 volt supply. This prevents the motor noise from affecting the voltage regulator U2. Capacitor C3 provides added power filtering. The values of the resistors and capacitors for the entire circuit are presented in Table 1.

Figure 15:
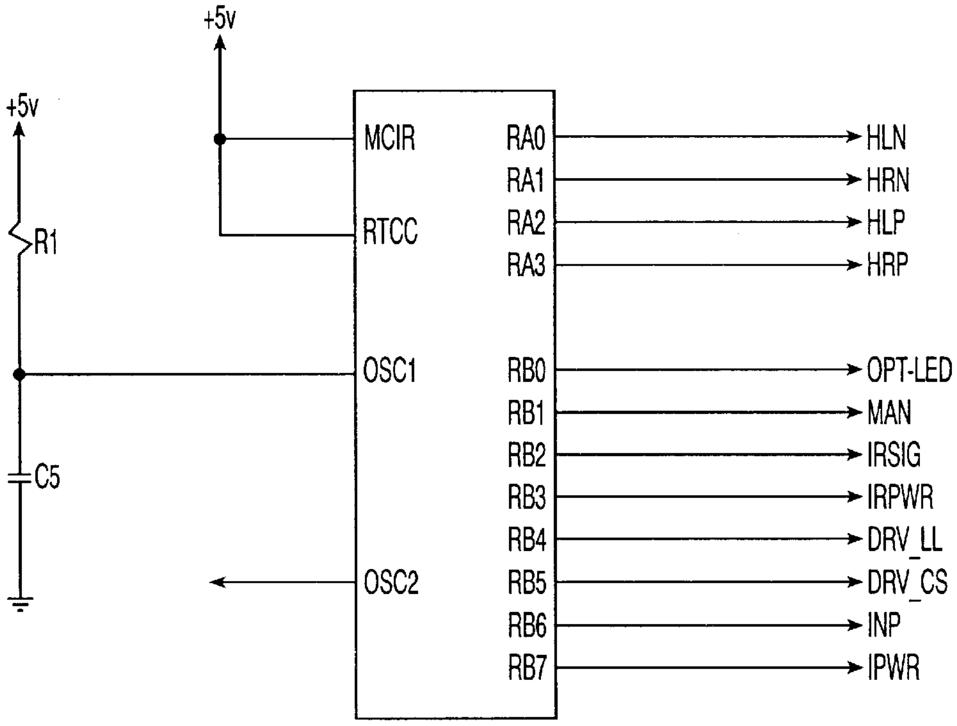
FIG. 15 is a circuit diagram of the processor connections.

FIG. 15 shows input and output lines connected to the processor 214. Resistor R2 and capacitor C5 from an oscillator at nominally 2.05 MHz (plus or minus 25%). This provides an internal timing clock for the processor.

Figure 16:
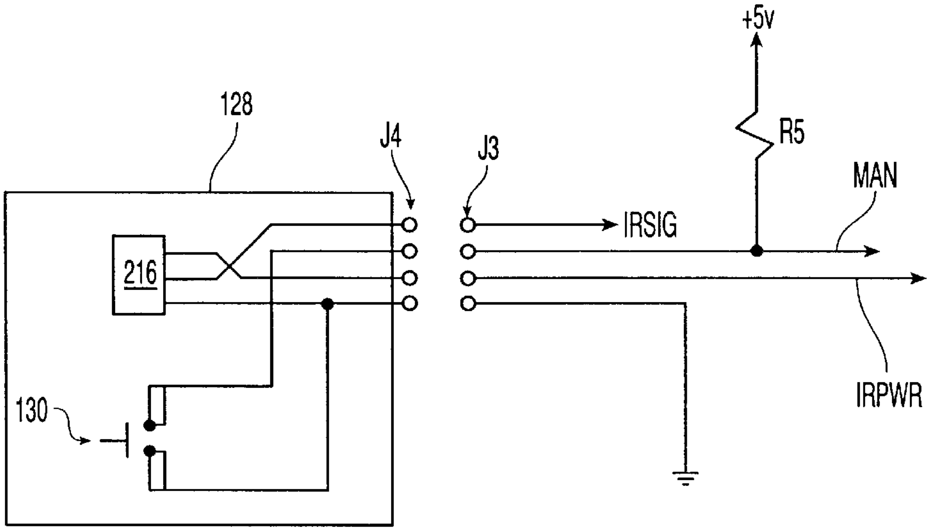
FIG. 16 is a circuit diagram of the interface module.

FIG. 16 presents the circuitry of the interface module 128. A 4-pin connector J3 on the interface module 128 communicates with a 4-pin connector J3 on the PC-board. As explained above, the four lines include an IR receiver power line IRPWR, an IR receiver signal line IRSIG, which is active low, a ground connection shared by both the manual switch 130 and the IR receiver 216 IRSIG, and the manual switch output line MAN which is pulled high by pull-up resistor R5, and is also active low.

TABLE 1

Component Values

| COMPONENT | VALUE |
|---|---|
| C1 | 10 mF |
| C2 | 10 mF |
| C3 | 10 mF |
| C5 | 22 pF |
| C6 | 0.1 μF |
| R1 | 51 kΩ |
| R2 | 10 kΩ |
| R3 | 100 kΩ |
| R4 | 300 kΩ |
| R5 | 100 kΩ |
| R6 | 1 kΩ |
| R7 | 1 kΩ |
| R8 | 1 kΩ |
| R9 | 620 Ω |

Figure 17:
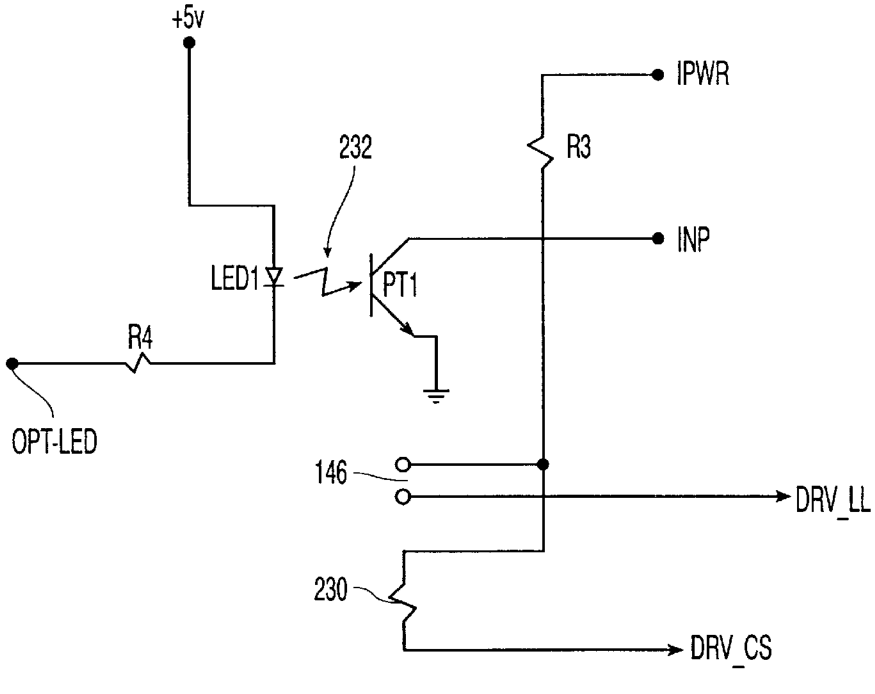
FIG. 17 is a circuit diagram of the sensor subcircuit.

FIG. 17 shows a circuit diagram of the sensor subcircuit 228. To enable any of the sensors, the processor 214 must apply power to the circuit by driving IPWR high (i.e., 5 volts) and monitor line INP. The processor must also enable the sensor it wishes to monitor by driving one of normally high OPT-LED, DRV__LL and DRV__CS lines low (i.e., setting it to 0 volts).

To determine the state of the channel selector strap 230 upon power startup, the processor 214 drives IPWR high, drives DRV__CS low (i.e., sets it to 0 volts) and monitors INP. If INP is low, the channel selector switch is deemed to be intact, and so the processor is informed that it should match incoming signals against reference sequences for channel A. If, on the other hand, INP is high, there is no continuity across the channel select strap 230, and the processor knows to match for channel B.

To determine the state of the lift cord detector 146, the processor again drives IPWR high, drives DRV__LL low, and monitors INP. If INP is low, this indicates that the detector's reed 148 is closed and so the lift cord 120' must be abutting the reed 148. This will inform the processor that there is tension in the lift cord 120' and that the shade is not at the bottom.

Finally, to activate the optical sensor 232, the processor 214 drives IPWR high, OPT-LED low, and monitors INP. This allows current to flow through LED1, causing it to emit light. This light is sensed by the phototransistor PT1, causing it to conduct and voltage to drop across resistor R3. Thus, when PT1 conducts, line INP is low. Each time the star wheel 198 interrupts the path between LED1 and PT1, line INP temporarily goes high. The number of times this line transitions from low to high and back to low is counted by the processor 214, and this number is translated into the number of rotations of the reel shaft 124 relative to some starting point.

When the motor is energized, the optical sensor 232 and star wheel 198 serve a second purpose. Each time the motor 122 is activated, the processor 214 starts an internal stall timer, which is formed as a register in memory. The stall timer times the interruptions of the magnetic or optical path, as caused by the spokes 200 of the star wheel 198. Each time an interruption occurs, the stall timer is reset. If the stall timer times out, it means that successive interruptions did not take place as quickly as they should have, and so the drive shaft 196 (and hence, the motor 122) did not turn as they should. This indicates a motor stall condition, such as when the shade is fully closed and can go no higher. Thus, whenever the motor 122 is running, the processor 214 checks for motor stall. If a stall is detected by the processor 214, it then no longer activates the motor 122, thus preventing damage to electrical and mechanical components of the assembly 100.

Figure 18:
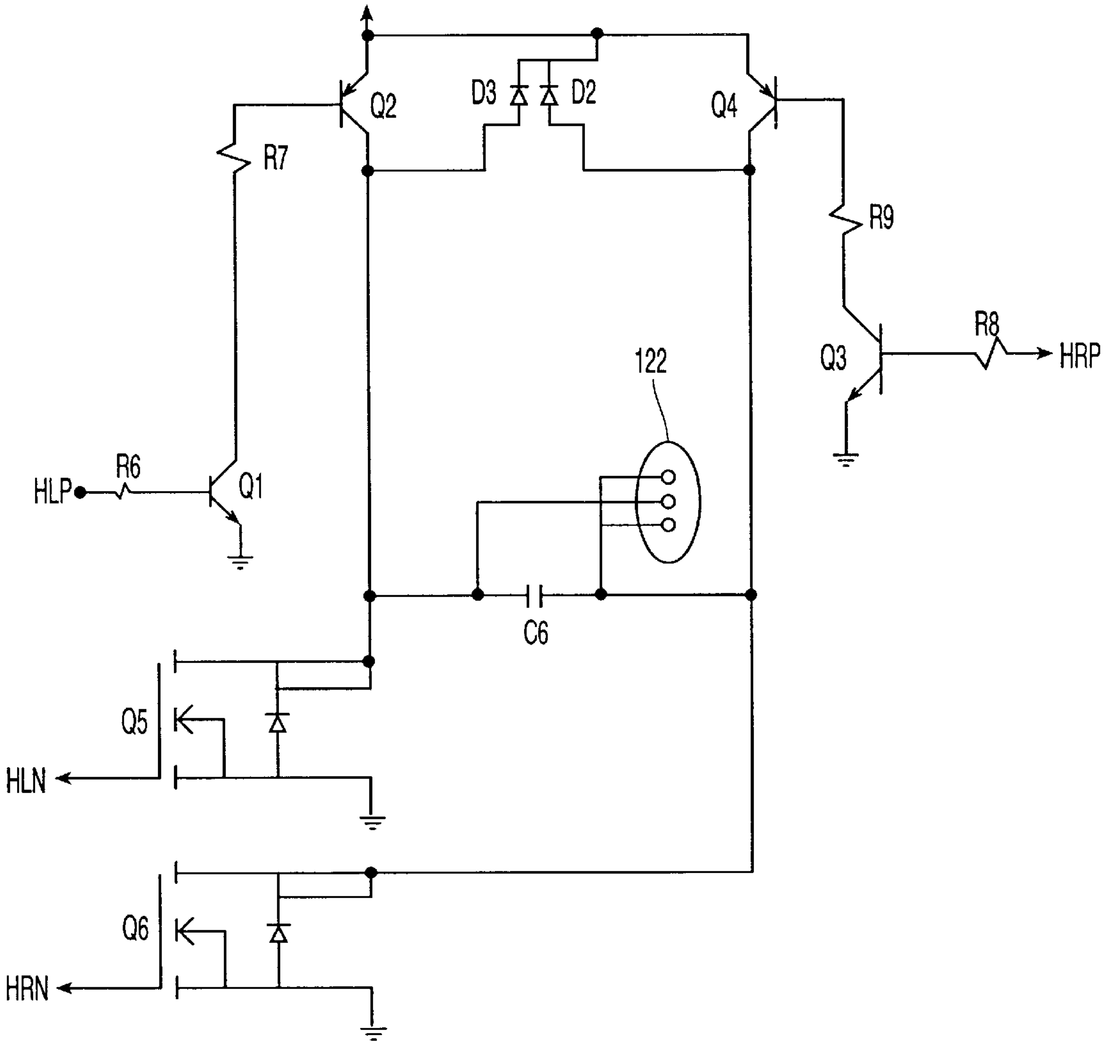
FIG. 18 is a circuit diagram of the bridge circuit.

FIG. 18 presents the circuit diagram of the H-bridge circuit 226. Four lines from the processor control the bridge. Lines HLP and HRP control the H-bridge's left and right P-circuit, respectively, and lines HLN and HRN control the H-bridge's left and right N-circuit, respectively. As shown in FIG. 17, the P-circuit controls the upper half of the H-bridge, and the N-circuit controls the lower half of the H-bridge.

As shown in FIG. 18, lines HLP and HRP are connected to the base leads of left and right NPN switching transistors Q1 and Q3, through an associated current limiting resistor R6 or R8. When either line HLP or line HRP is driven high by the processor 214, the corresponding base-emitter junction on Q1 or Q3 is forward biased, allowing current to flow through that transistor, assuming other conditions are met. The collectors of Q1 and Q3 are connected via resistors R7 and R9 to the base leads of associated respective left Q2 and right Q4 PNP power transistors. The emitters of these two power transistors, Q2 and Q4, are connected to the 12 volt power supply, while their collectors are connected to separate leads of a connector J5. Connector J5, in turn, is connected to corresponding leads of the motor 122, allowing the latter to be energized in either direction.

Lines HLN and HRN are connected to the gates of N-channel MOSFETs Q5 and Q6, respectively. These lines are normally high when the motor 122 is not activated, thus turning on the Q5, Q6. This is the brake condition, which blocks current from passing from the collectors of Q3 and Q4, through the MOSFETs and on to ground.

When the motor 122 is to be activated in a first direction, HLP is driven high and HLN is driven low simultaneously. And, when the motor is to be activated in a second direction, HRP is driven high and HRN is driven low. In this manner, the bridge circuitry is configured to activate the motor in either direction. While the motor 122 is running, diodes D2 and D3 provide protection from back electro-motive force (EMF) from the motor 122 and capacitor C6 filters some of the high frequency noise from the motor 122.

The operation of the window covering assembly 100 is described next. As discussed above, the processor's RAM comprises a number of storage locations which keep track of sensor and status data. Among these storage locations are: a) a rotation counter, b) an upper limit register, which keeps track of the upper limit to which the shade may rise, c) a looking-for-upper-limit flag, which keeps track of whether or not the processor should look for an upper limit, d) a channel register, which keeps track of which channel's reference sequences should be used for matching with the received sequences, and e) a direction register, which keeps track of the last direction of shade travel.

On power startup, the rotation counter and upper limit counter are both set to a large, predetermined value, indicating that there is no upper limit, and the looking-for-upper-limit flag is set to not look for an upper limit. Also, the last direction counter is set to up (so that if the manual switch 130 is pushed, the shade will go down), and the channel register is set to A or B, depending on the channel strap.

After these registers are initialized, the processor enters a quiescent state in which the processor 214 first checks whether the manual switch 130 has been pushed. If the manual switch 130 has not been pushed, the processor next turns on the IR receiver 216 for 7.1 msec and then turns it off. If no valid pulse was received within that period, the processor enters a sleep state for a predetermined period of time, about 300 msecs. As it enters the sleep state, the processor 214 makes sure that the transistors Q2 and Q4 are off, MOSFETs Q5 and Q6 are on (brake) and that all other outputs and sensors are off. After waking up, the processor 214 loops through the quiescent state once again. If, during the quiescent state, either the manual switch 130 is pushed or a valid pulse is received, the processor 214 enters the active state.

In the active state, the processor 216 processes the input, and takes any necessary action in response, such as activating the motor 122. When the motor is running, the IR receiver is 216 is placed in the active mode and the processor 216 checks IRSIG, checks the lift cord detector 146, updates the rotation counter with each interruption, and checks the stall timer, and the manual switch 130.

At any given time, the shade 106 can be in one of three positions: 1) shade fully up (open), 2) shade fully down (closed), and 3) the shade partially down. Also, as stated above, the shade can be activated by either a) the manual switch 130, or b) either button 220*a*, 220*b* on the transmitter 218. This gives a total of six combinations, or examples, to illustrate processor behavior, when in the active state.

Example 1. Shade 106 fully up (open) and the manual switch 130 pushed. In this case, the lift cord detector 146 is abutted by the cord 120', and so is closed. The processor 214 first checks the direction register and determines in which direction the shade 106 last travelled.

Case 1a. Last direction of travel was "up". The appropriate half of the bridge circuit is turned on, and, after an appropriate delay to avoid a short circuit, the other half of the bridge circuit is turned off. The motor is turned on and the shade goes down. The shade will continue to travel downward until a) the lift cord detector 146 is opened by rotating the cord 120' off the reed 148 when the shade reaches the bottom of its travel, b) the shade encounters an obstacle, relieving tension in the cord 120' and causing it to no longer abut the reed 148, c) the manual switch 120 is pushed a second time, or d) either transmitter button 220*a*, 220*b* is pushed. Regardless of which of these events take place, the direction register is toggled to indicate that the last direction was "down", and motor and shade are stopped, after which the processor enters the sleep state.

Case 1b. Last direction of travel was "down". The processor will first check to see whether the shade is at the upper limit (i.e., the value in the rotation counter matches that in the upper limit register). If this is the case, the processor will ignore the manual switch and enter the sleep state. If, for whatever reason, the rotation counter indicates that upper limit has not been reached, the processor 214 will activate the motor 122 to try to force the shade up. As the shade will not go up, the stall timer will immediately time out, causing the processor to deactivate the motor. Following this, the direction register is toggled to indicate that the last direction was "up", and the processor enters the sleep state.

Example 2. Shade 106 fully up (closed) and a transmitter 218 button is pushed. Again, the lift cord detector 146 will be closed. The processor 214 ignores the direction register and determines which button was pushed.

Case 2a. Down button 220*b* is pushed. The shade will go down. The processor and shade will behave in the same way as in Case 1a, except that the shade will stop if either transmitter button 220*a*, 220*b* is pushed a second time.

Case 2b. Up button 220*a* is pushed. The processor and shade will behave in the same way as in Case 1b. Again, the stall timer will time out, causing the motor to stop, after which the processor will toggle the direction register, and then enter the sleep state.

Example 3. Shade 106 fully down (closed) and the manual switch 130 pushed. In this case, the lift cord detector 146 will be open, indicating that either the shade is fully lowered, or that the shade is resting on an object. The processor 214 first checks the direction register and determines in which direction the shade 106 last travelled.

Case 3a. Last direction of travel was "up". The processor 214 will determine that the lift cord detector is open. Because it is open, the processor will not allow the shade to be lowered, and so will enter the sleep state.

Case 3b. Last direction of travel was "down". The processor will determine that the lift cord detector is open. This will cause it to reset the rotation counter to zero, and enable the looking-for-upper-limit flag so that, upon ascent, the processor will compare the value in the rotation counter to the value in the upper limit register. The processor will then activate the motor to raise the shade. The shade will continue to travel upward until a) the stall timer times out, indicating that the motor has stalled (e.g., the shade is fully raised), b) the rotation counter reaches the value in the upper limit register, c) the manual button is pushed a second time, or d) either transmitter button 220*a*, 220*b* is pushed. Regardless of which of these events take place, the direction register is toggled to indicate that the last direction was "up", and motor and shade are stopped, after which the processor enters the sleep state.

Example 4. Shade 106 fully down (closed) and a transmitter 218 button is pushed. Again, the lift cord detector 146 will be open, indicating that either the shade is fully lowered, or that the shade is resting on an object. The processor 214 ignores the direction register and determines which button was pushed.

Case 4a. Down button 220*b* is pushed. The processor 214 will determine that the lift cord detector is open and so it will not activate the motor to lower the shade. If the button 220*b* is pushed for less than 3 seconds, nothing else happens and the processor enters the sleep state. If, however, the button 220*b* is pushed for 3 seconds or longer, the upper limit counter is set to a large, predetermined value, indicating that there is no upper limit. After this, the processor enters the sleep state.

Case 4b. Up button 220*a* is pushed. The processor and shade will behave in substantially the same way as in Case 3b, except that the shade will stop if either transmitter button 220*a*, 220*b* is pushed a second time. Additionally, however, if a stall is detected when the shade is being raised from the lower limit, a new upper limit will be set. For this, the upper limit register will be set to 5 pulses less than the rotation counter, which has been reset to zero just before the shade began to rise. The new upper limit value will help ensure that the next time the shade is raised, (after first having been lowered), the shade will stop at the new upper limit, instead of continuing on and encountering a stall condition.

Example 5. Shade 106 partially open and the manual switch 130 pushed. In this case, the lift cord detector 146 is abutted by the cord 120', and so is closed. The processor 214 first checks the direction register and determines in which direction the shade 106 last travelled.

Case 5a. Last direction of travel was "up". The shade will go down until a) the lift cord detector 146 is opened by rotating the cord 120' off the reed 148 when the shade reaches the bottom of its travel, b) the shade encounters an obstacle, relieving tension in the cord 120' and causing it to no longer abut the reed 148, c) the manual switch 120 is pushed a second time, or d) either transmitter button 220*a,* 220*b* is pushed. Regardless of which of these events take place, the direction register is toggled to indicate that the last direction was "down", and motor and shade are stopped, after which the processor enters the sleep state. This is similar to Case 1a.

Case 5b. Last direction of travel was "down". The processor will first check to see whether the shade is at the upper limit (i.e., the value in the rotation counter matches that in the upper limit register). If this is the case, the processor will ignore the manual switch and enter the sleep state. If the upper limit has not been reached, the shade will go up until a) the stall timer times out, indicating that the motor has stalled (e.g., the shade is fully raised), b) the rotation counter reaches the value in the upper limit register, c) the manual button is pushed a second time, or d) either transmitter button 220*a,* 220*b* is pushed. Regardless of which of these events take place, the direction register is toggled to indicate that the last direction was "up", and motor and shade are stopped, after which the processor enters the sleep state.

Example 6. Shade 106 partially open and a transmitter 218 button is pushed. Again, the lift cord detector 146 is abutted by the cord 120', and so is closed. The processor ignores the direction register and determines which button was pushed.

Case 6a. Down button 220*b* is pushed. The processor and shade will behave in the same way as in Case 5a, except that the shade will stop if either transmitter button 220*a,* 220*b* is pushed a second time.

Case 6b. Up button 220*a* is pushed. The processor and shade will behave in the same way as in Case 5b, except that the shade will stop if either transmitter button 220*a,* 220*b* is pushed a second time.

Figure 19:
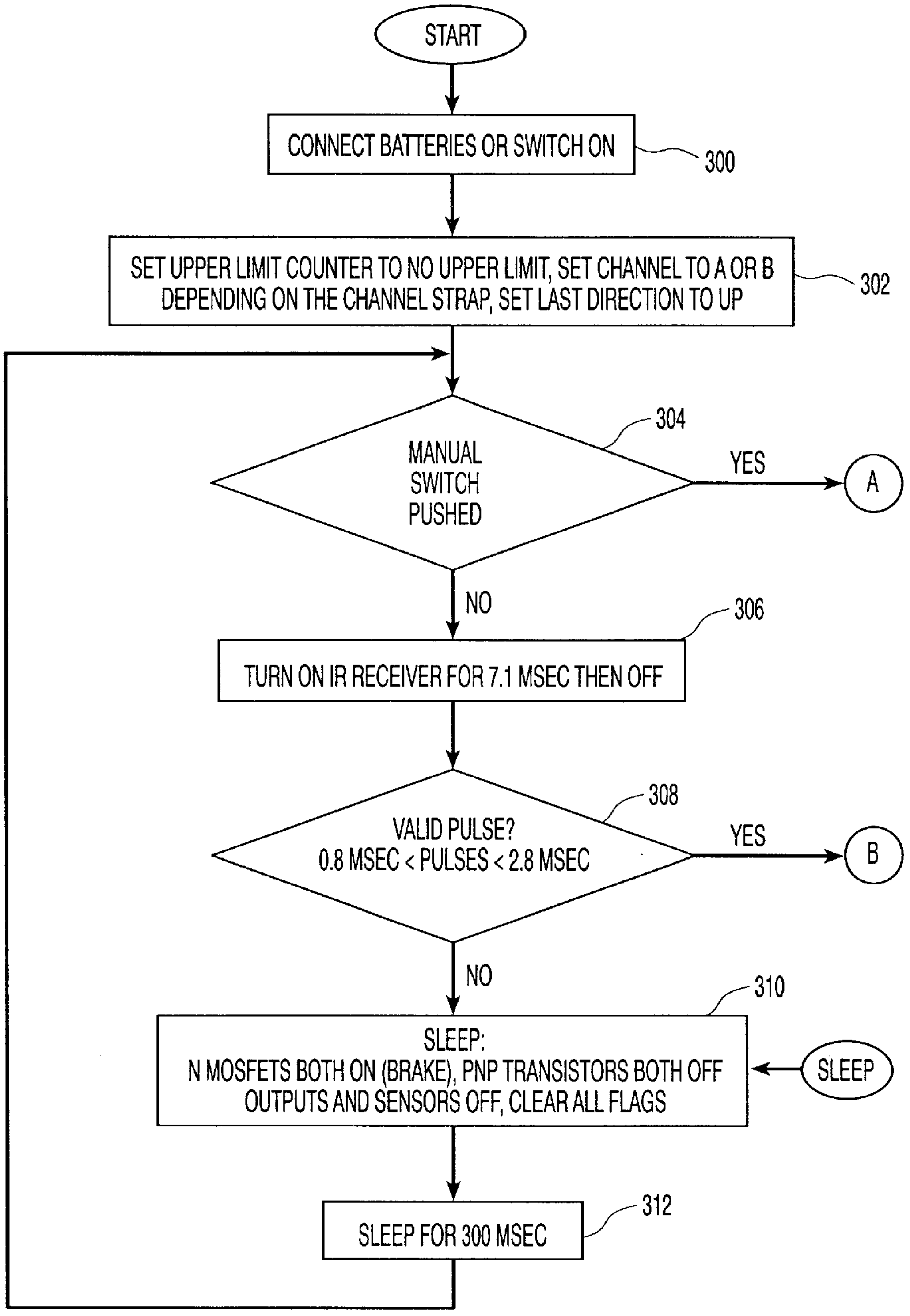
FIGS. 19, 19A–19J present a flow chart illustrating the microprocessor controlled operation of the window covering shown in FIG. 1.
Figure 19A:
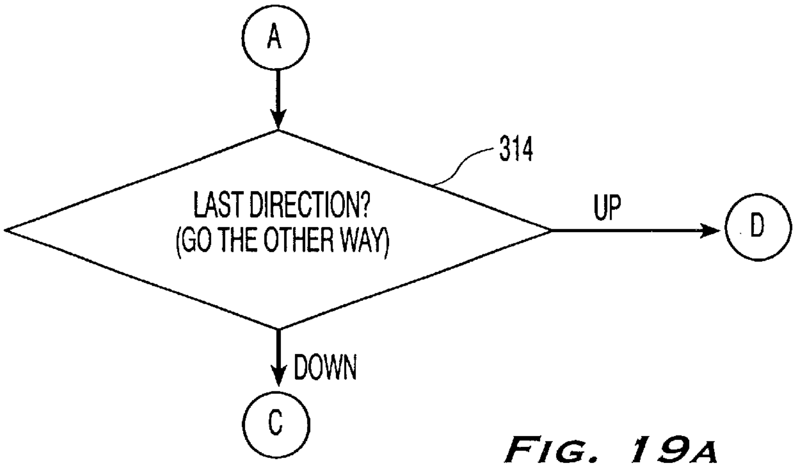
Figure 19B:
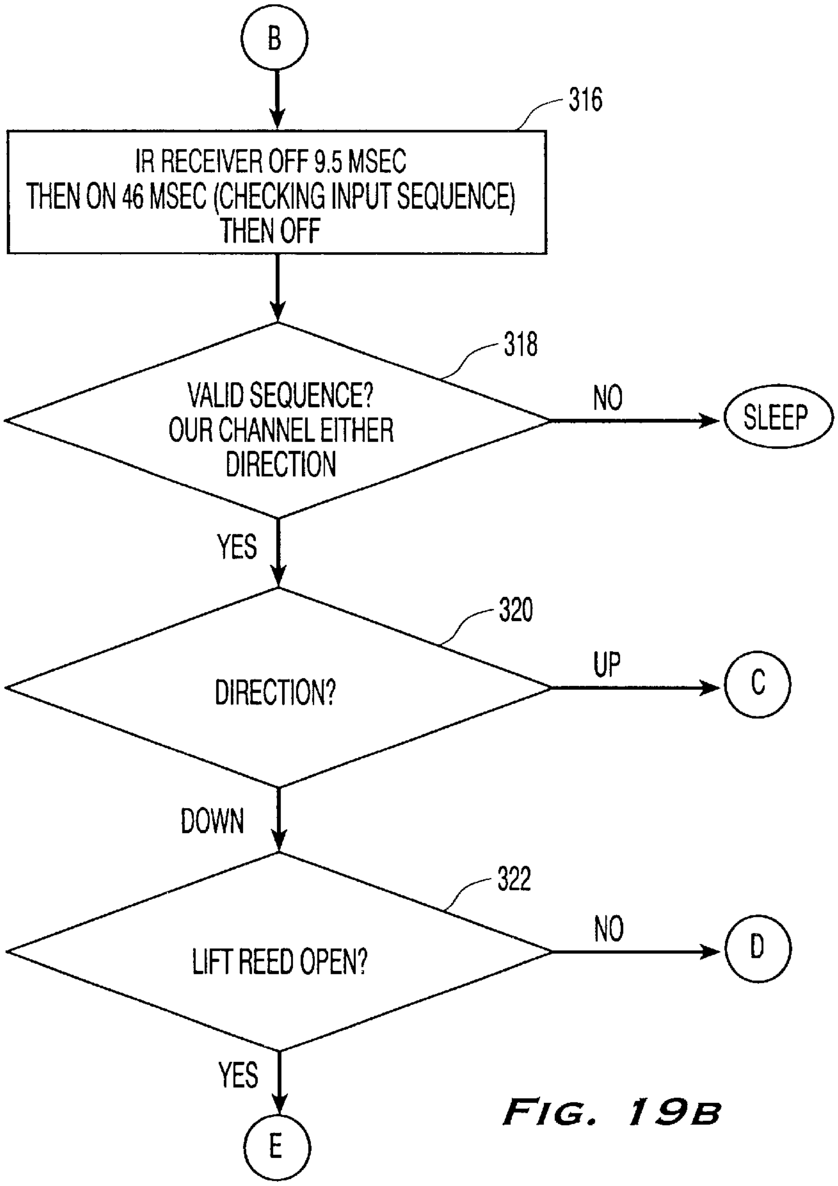
Figure 19C:
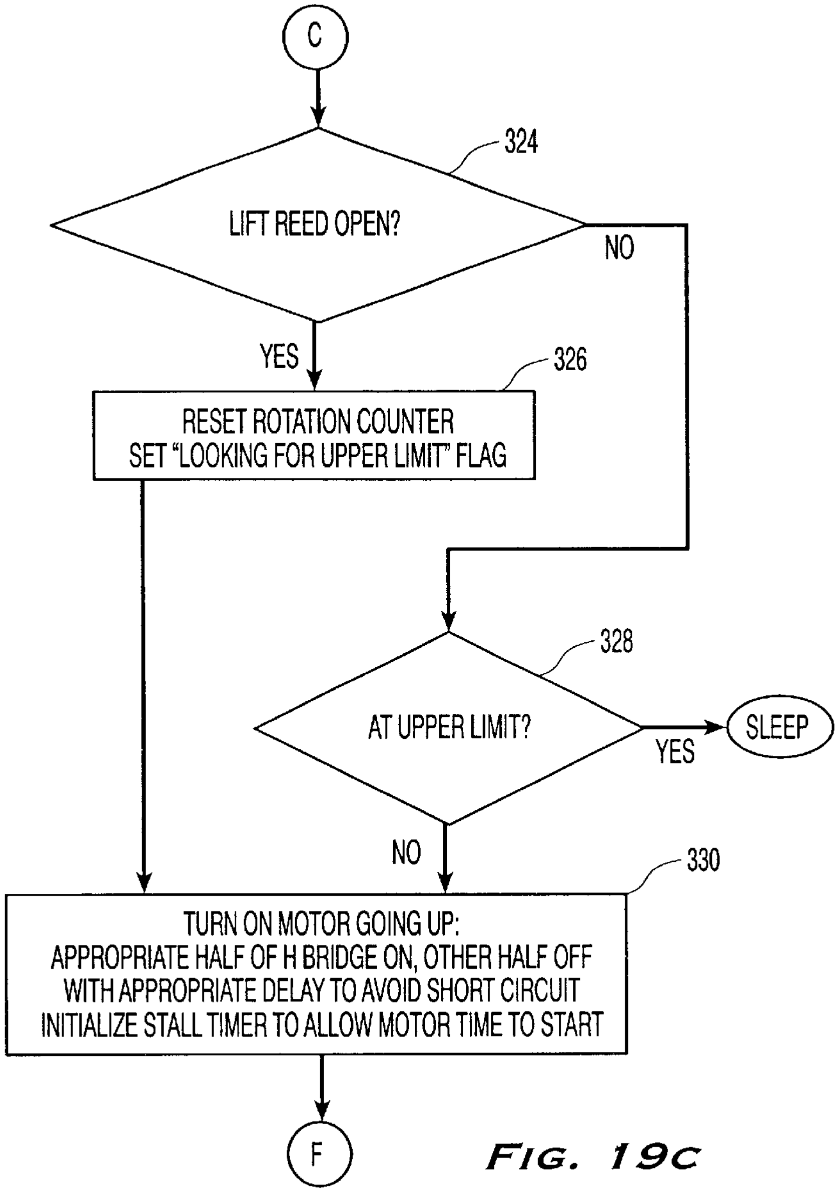
Figure 19D:
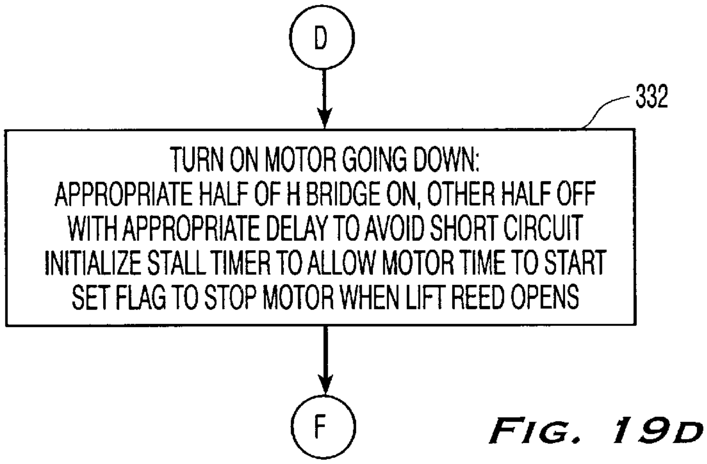
Figure 19E:
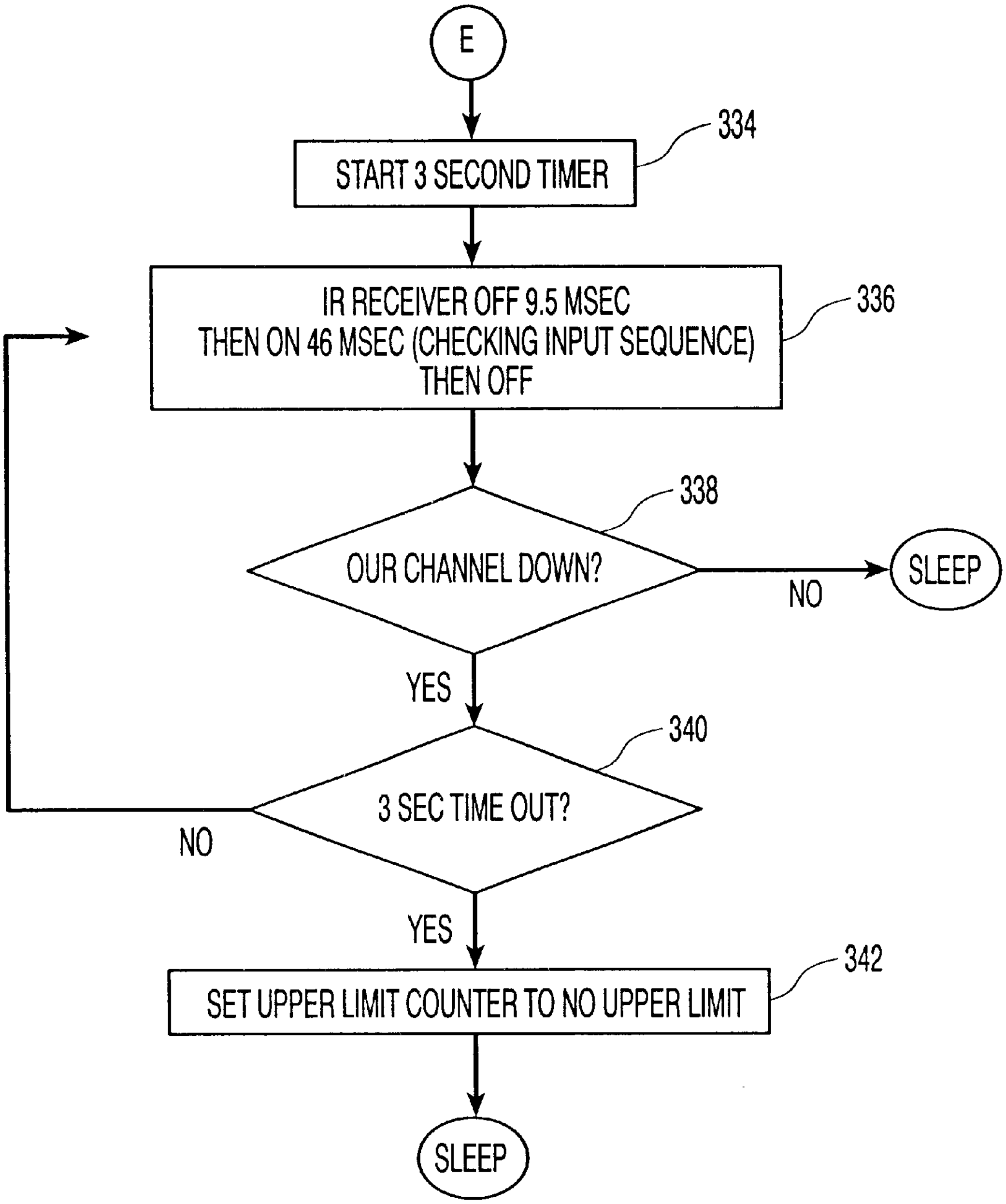
Figure 19F:
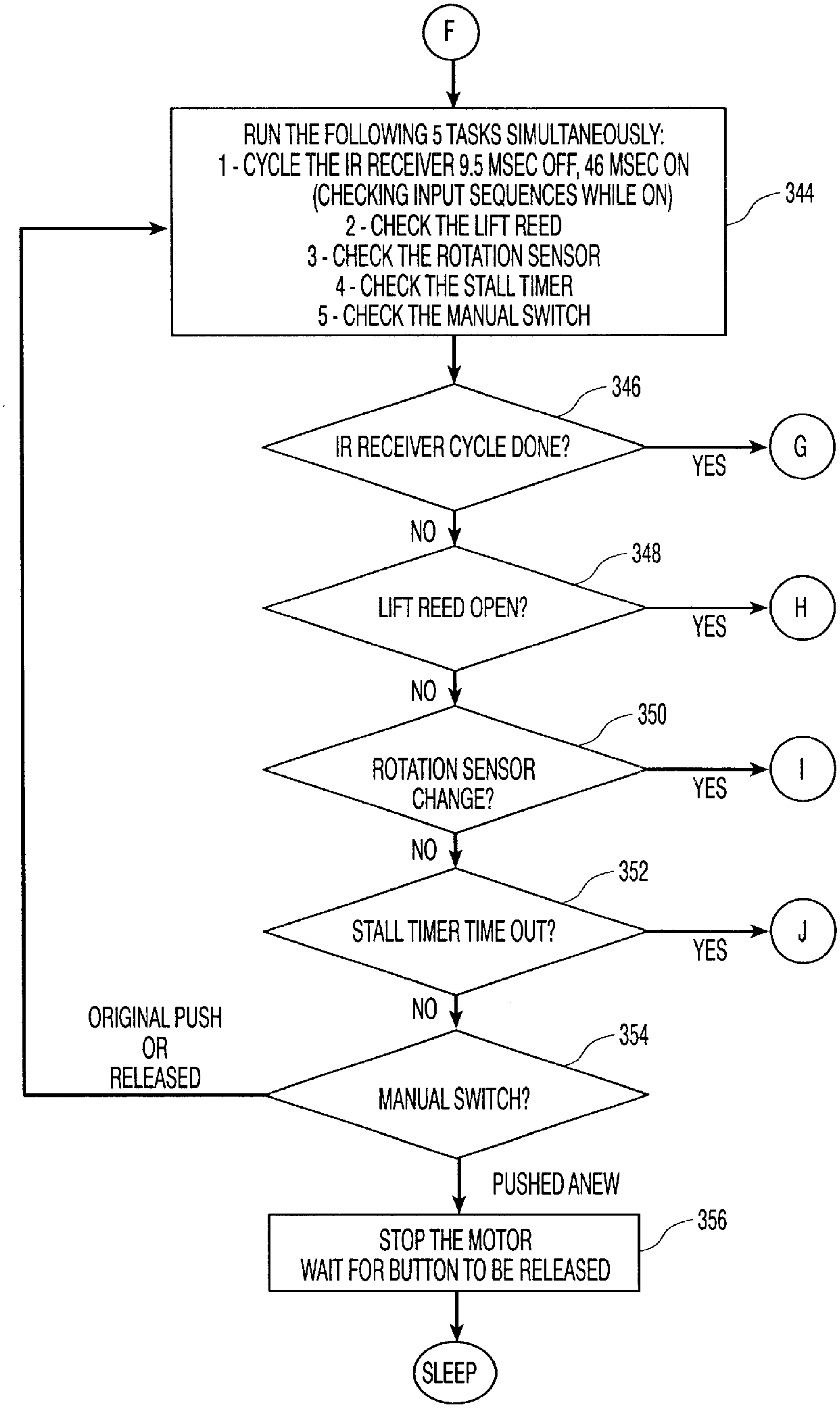
Figure 19G:
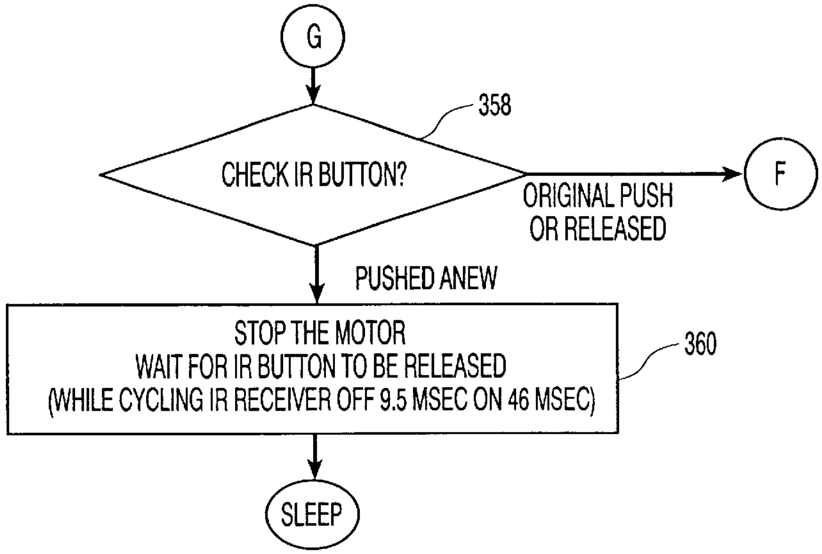
Figure 19H:
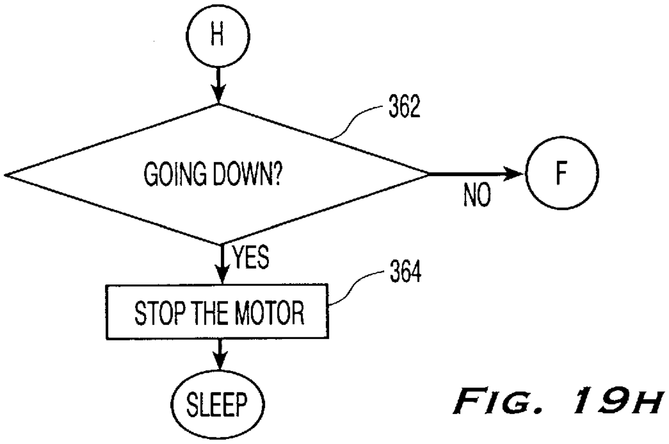
Figure 19I:
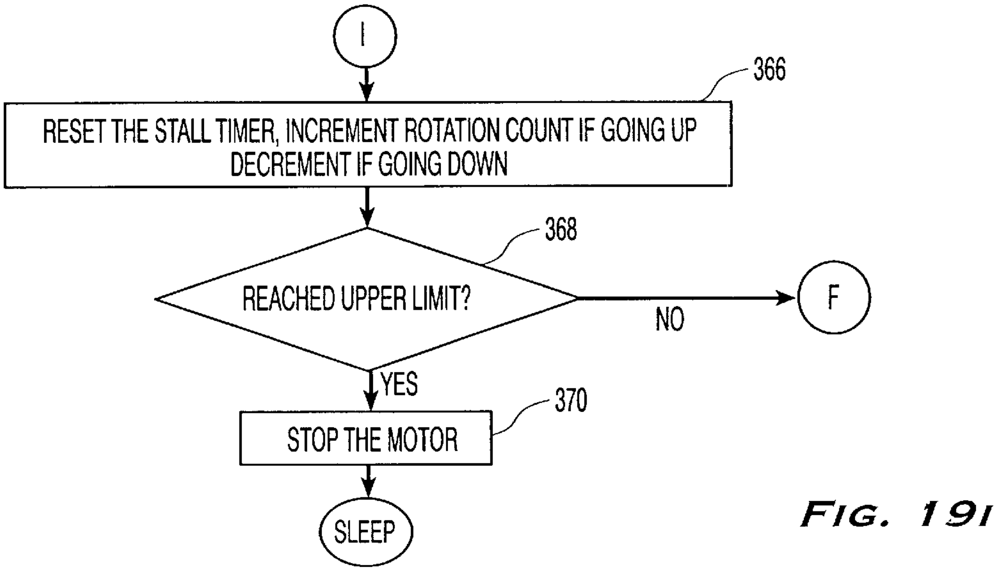
Figure 19J:
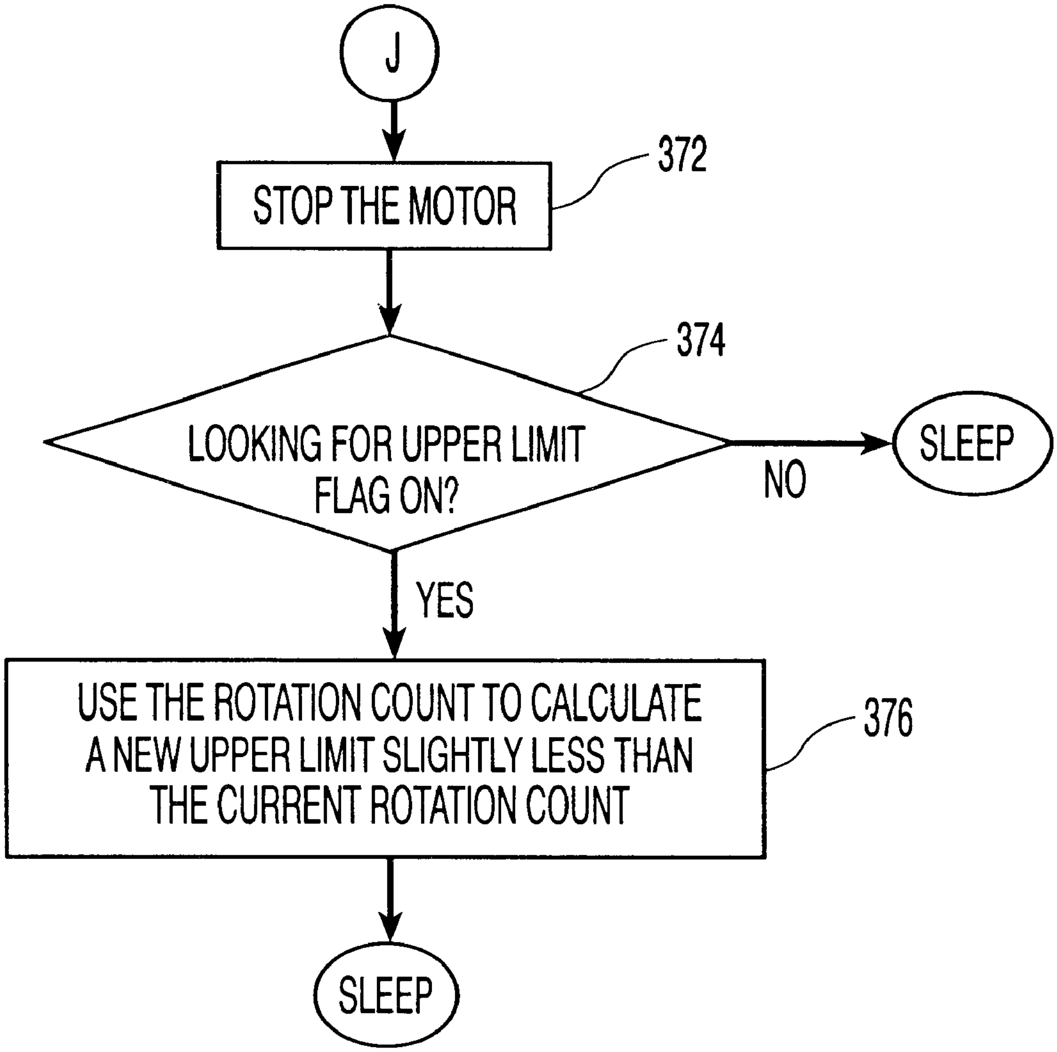

The processor 214 executes a series of software instructions to control the window covering assembly. FIGS. 19 and 19-A to 19-J present a flowchart which illustrates this software control. Processor operation begins with powering up the system in step 300. This is followed by step 302 in which various registers, counters and flags are initialized, and the channel strap is read. Once this initialization is finished, the processor enters the quiescent state in which the processor looks for activity from either the manual switch 130 or the IR receiver 216.

In step 304, the processor checks line MAN to see if the manual switch has been pushed. If so, control flows to step 314 in FIG. 19-A. If, however, the manual switch 130 has not been pushed, the IR receiver is turned on for 7.1 msecs and then turned off in the look mode (step 306). The processor then samples IRSIG to see whether a valid pulse was received (step 308). If so, control flows to step 316 in FIG. 19-B, If, however, no valid pulse was received, the processor enters a sleep mode (step 308) in which it remains, nominally, for 300 msecs before waking up (step 312). The processor then continues in the quiescent state with control looping back to step 304 to see if the manual switch 130 was pushed.

FIG. 19-A illustrates the control sequence when the manual switch was pushed when the processor was in the quiescent state. In step 314, the processor checks the direction register to see in which direction the shade last was asked to move. If the last direction was UP, it means that the shade should go down, and so control flows to step 332 in FIG. 19-D. If, on the other hand, the last direction was DOWN, the shade should now go up, and so control flows to step 324 in FIG. 19-C.

FIG. 19-B illustrates the control sequence when a valid pulse was received when the processor was in the quiescent state. First, in step 316, the processor places the IR receiver 216 in the active mode, discussed above. Next, in step 318, the processor attempts to match the received sequence of pulses with the reference sequences for the selected channel. If there is no match, the processor enters the sleep state (step 310). If there is a match, the processor determines which button on the transmitter, UP or DOWN, was pushed (step 320). If the UP button was pushed, control goes to step 324 in FIG. 19-C. If the DOWN button was pushed, the processor checks to see whether the lift cord detector reed is open (step 322). If the detector is not open, control goes to step 322 in FIG. 19-D; if it is open (indicating that the shade is either fully lowered or resting on an object), control goes to step 334 in FIG. 19-E.

FIG. 19-C illustrates the control sequence when the processor has been instructed by either the manual switch or the transmitter to raise the shade. The processor first determines whether the lift cord detector reed is open (i.e., whether the shade is fully lowered or is resting on an object) (step 324). If the detector is open, then the shade resets the rotation counter and sets the looking-for-upper-limit flag (step 326), and then turns on the motor to raise the shade (step 330). If the detector is closed, the processor first checks whether the shade is at the upper limit (step 328). If the shade is already at its upper limit, the shade need not be raised, and so the processor goes to sleep (step 310). On the other hand, if the shade is not already at its upper limit, it can rise some more, and so the processor turns on the motor to raise the shade (step 330). Whether or not the lift reed was open, control goes to step 344 in FIG. 19-F, after the motor starts.

FIG. 19-D illustrates the control sequence when the processor has been instructed by either the manual switch or the transmitter to lower the shade. The motor is simply turned on to lower the shade (step 332), after which control passes to step 344 in FIG. 19-F.

FIG. 19-E illustrates the control sequence when the lift cord detector reed is open and the down button on the transmitter has been pushed. The processor first starts a 3-second timer (step 334), which is used to determine whether the down button is pressed for the full three seconds. The IR receiver is maintained in the active mode (step 336) and the processor checks the IRSIG line to see whether the DOWN button is still being pressed (step 338). If the DOWN button stops being pressed at any time within those three seconds, the processor enters the sleep state (step 310), as the shade cannot be lowered (since the lift cord detector reed is open). The processor stays keeps checking the IRSIG line until either the DOWN button is released or until the 3 seconds are over (step 340), whichever occurs first. If the 3-second timer times out, the upper limit counter is reset (step 342), and the processor enters the sleep state (step 310).

FIG. 19-F illustrates the control sequence when the motor is running, either up or down. With the motor running, the IR receiver is in the active mode, the IRSIG and MAN lines from the interface module 128 are monitored, the optical sensor 232, and the lift detector reed 148 are polled, and the stall timer is operational (step 344). The processor then executes a loop to check on all of these.

When the IRSIG line is being monitored (step 346), control flows to step 358 in FIG. 19-G. When the processor polls the lift cord detector reed 148, it determines whether the reed is open (step 348). If so, control goes to step 362 in FIG. 19-H. When the processor polls the optical sensor (i.e, the phototransistor) it determines whether the light path has been interrupted (step 350). If so, control goes to step 366 in FIG. 19-I. If the stall timer times out (step 352), control goes to step 372 in FIG. 19-J. And when the MAN line is being monitored (step 354), the processor is interested in knowing whether the manual switch 130 has been pushed anew since the motor started running. If the manual switch has not been pushed anew, the motor continues to run and the processor continues to check the various inputs. If, however, it has been pushed anew, the motor is stopped (step 356) and the processor eventually enters the sleep state (step 310).

FIG. 19-G illustrates the control sequence when the motor is running and the IR receiver is being monitored. The processor checks to see if line IRSIG is active and if it is, whether either transmitter button has been pushed anew since the motor started running (step 358). If neither button has been pushed anew, the motor continues to run and the processor continues to check the various inputs. If, however, either button has been pushed anew, the motor is stopped (step 360) and the processor eventually enters the sleep state (step 310).

FIG. 19-H illustrates the control sequence when the motor is running and the lift cord detector reed is opened. The processor first checks to see whether the shade was going down when this happened (step 362). If it was going down, the motor is stopped (364), because the cord has fully unwound or because the shade bumped into an obstacle on the way down. After the motor is stopped, the processor enters the sleep state (step 310). If, on the other hand, the shade was going up, the processor doesn't care, and the motor continues to run and raise the shade.

FIG. 19-I illustrates the control sequence when the motor is running and an interruption in the light path is detected. Whenever the light path is interrupted, it means star wheel 198, and thus the reel 124 are turning, the shade is either being raised or lowered, and the motor is not stall condition. Thus, the processor resets the stall timer and increments the rotation counter (step 366). The processor then compares the rotation counter to the value in the upper limit register (step 368). If they do not match, it means that the upper limit for the shade has not been met, and the motor continues to run. If, on the other hand, they match, the upper limit has been reached. In such case, the motor is stopped (step 370), and the processor enters the sleep state (step 310).

FIG. 19-J illustrates the control sequence when the motor is running and the stall timer times out. When this happens, it means that the star wheel 198 and the reel 124 did not turn, even though the motor was on, thus indicating a motor stall condition. A motor stall can happen when the shade is all the way up and the rotation counter does not match the value in the upper limit register. It can also happen if the shade is held by an object which prevents the former from rising. Other situations may also cause the timer to time out. Regardless of what causes this, the motor is first stopped (step 372). The processor then checks whether the rotation counter was to stop when it reached the value in the upper limit register (step 374). If so, the upper limit register is set to a value slightly below the current rotation count (step 376). This will prevent stall due to a spurious upper limit register value, on a subsequent raising of the blind. After step 376 and also, in the event that the rotation counter was not to be matched against the upper limit register value, the processor enters the sleep state (step 310).

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A battery-powered remote-control motorized window treatment assembly having a window covering movable between a lowered position and a raised position, comprising:

- a head rail;
- a reversible dc motor disposed in the head rail and operatively coupled to the window covering;
- at least one battery mounted in the head rail and configured to power the reversible dc motor;
- a manual switch mounted on the head rail and configured to output a manual control signal when the manual switch is activated;
- a remote control sensor configured to detect a user-generated wireless remote control signal and output a sensed remote control signal in response thereto;
- a microprocessor configured to respond to at least two different sensed remote control signals output by the remote control sensor in response to at least two different corresponding user-generated wireless remote control signals, the microprocessor further configured to cause the reversible dc motor to turn in a first direction in response to a first sensed remote control signal and turn in a second direction in response to a second sensed remote control signal which is different from the first sensed remote control signal, the microprocessor having associated therewith a memory storing executable code for controlling operation of the window covering, the microprocessor having a plurality of connections including:
  - a ground connection;
  - a voltage supply input;
  - a first position input configured to receive information reflective of either a movement or position of said window covering;
  - a manual signal input configured to receive said manual control signal from said manual switch;
  - a remote signal input configured to receive said sensed remote control signal from said remote control sensor; and
  - first and second motor drive signal outputs, each motor drive signal output configured to output a motor drive signal to energize the motor to turn in one of two directions, in response to either a valid user-generated wireless remote control signal or a manual control signal.

2. The assembly of claim 1, wherein the remote control sensor is a light sensor configured to receive a user-generated infrared light signal from a remote control infrared transmitter.

3. The assembly of claim 2, wherein the light sensor is an infrared receiver having a power supply lead, a ground lead and an output lead, the infrared receiver configured to detect and demodulate said user-generated infrared light signal.

4. The assembly of claim 2, wherein the assembly is provided with a daylight-blocking window positioned in front of said light sensor to help reduce ambient light impinging on the light sensor.

5. The assembly of claim 1, wherein the microprocessor is configured to store position information reflective of a vertical position of said window covering; and wherein said executable code includes:

code to update said position information based on received sensor pulses;

code to compare said position information with a predetermined value; and code to de-energize said motor, if said position information corresponds to said predetermined value.

6. The assembly of claim 5, wherein said predetermined value is reflective of an upper limit of travel of said window covering.

7. The assembly of claim 1, wherein the first position input is configured to receive pulses from a sensor while the window covering is moving.

8. The assembly of claim 7, wherein said executable code includes:

code to keep track of lapsed time between successive sensor pulses, when said motor is energized, and code to turn off the motor, if a sensor pulse is not received within a predetermined time period, while said motor is energized.

9. The assembly of claim 8, wherein an optical sensor is connected to the first position input to create the sensor pulses in response to interruptions of a light beam.

10. The assembly of claim 1, wherein the microprocessor is configured to store information reflective of a last direction of travel of the window covering, and wherein said executable code includes:

code to check a direction register to determine the last direction of travel, in response to an actuation of said manual switch; and code to write information reflective of a most recent direction of travel into said direction register, at the end of said most recent direction of travel.

11. The assembly of claim 1, wherein said executable code includes:

code to determine whether the manual switch has been pushed while the motor is energized, and code to de-energize the motor, if said manual switch has been pushed.

12. The assembly of claim 1, wherein said executable code includes:

code to raise the window covering in response to a first manual control signal, stop the window covering from further rising in response to a second manual control signal, lower the window covering in response to a third manual control signal, and stop the window covering from further lowering in response to a fourth manual control signal, when said first, second, third and fourth manual control signals are created by four successive activations of said manual switch.

13. The assembly of claim 1, wherein said manual switch is a momentary contact switch mounted on the head rail.

14. The assembly of claim 1, further comprising:

a voltage circuit having an input connected to said at least one battery, said voltage circuit having at least first and second output voltage levels, said first output voltage level being connected to said voltage supply input of the microprocessor, and said second voltage level being selectively connected to said motor to provide power to drive said motor, upon output from said microprocessor of a motor drive signal in response to either a valid sensed remote control signal or a manual control signal, the second output voltage level being not greater than 12 volts.

15. The assembly of claim 1, wherein the microprocessor further comprises first and second brake outputs configured to prevent current from flowing through the motor, in the absence of a motor drive signal resulting from either a valid user-generated light signal or a manual control signal.

16. The assembly of claim 1, wherein the microprocessor is further provided with a channel-selection input configured to allow a user to select from among a plurality of sensed remote control signals which will energize the motor to operate the window covering.

17. The assembly of claim 1, wherein the microprocessor is configured to adjust a setting of an upper limit of travel so as prevent the motor from encountering a stall condition on a subsequent activation of the motor.

18. The assembly of claim 17, wherein the upper limit of travel is set after the window covering has risen and the motor has encountered a stall condition.

19. In a window treatment assembly having a head rail and a window covering movable between a lowered position and a raised position, the improvement comprising:

a reversible dc motor disposed in the head rail and operatively coupled to the window covering;

at least one battery mounted in the head rail and configured to power the reversible dc motor;

a manual switch mounted on the head rail and configured to output a manual control signal when the manual switch is activated;

a remote control sensor configured to detect a user-generated wireless remote control signal and output a sensed remote control signal in response thereto; and a microprocessor configured to respond to at least two different sensed remote control signals output by the remote control sensor in response to at least two different corresponding user-generated wireless remote control signals, the microprocessor further configured to cause the reversible dc motor to turn in a first direction in response to a first sensed remote control signal and turn in a second direction in response to a second sensed remote control signal which is different from the first sensed remote control signal, the microprocessor having associated therewith a memory storing executable code for controlling operation of the window covering, the microprocessor having a plurality of connections including:

a ground connection;

a voltage supply input;

a first position input configured to receive information reflective of either a movement or position of said window covering;

a manual signal input configured to receive said manual control signal from said manual switch;

a remote signal input configured to receive said sensed remote control signal from said remote control sensor; and first and second motor drive signal outputs, each motor drive signal output configured to output a motor drive signal to energize the motor to turn in one of two directions, in response to either a valid user-generated wireless remote control signal or a manual control signal.

20. The assembly of claim 19, wherein the remote control sensor is a light sensor configured to receive a user-generated infrared light signal from a remote control infrared transmitter.

21. The assembly of claim 20 wherein the light sensor is an infrared receiver having a power supply lead, a ground lead and an output lead, the infrared receiver configured to detect and demodulate said user-generated infrared light signal.

22. The assembly of claim 20, wherein the assembly is provided with a daylight-blocking window positioned in front of said light sensor to help reduce ambient light impinging on the light sensor.

23. The assembly of claim 19, wherein the microprocessor is configured to store position information reflective of a vertical position of said window covering; and wherein said executable code includes:

code to update said position information based on received sensor pulses;

code to compare said position information with a predetermined value; and code to de-energize said motor, if said position information corresponds to said predetermined value.

24. The assembly of claim 23, wherein said predetermined value is reflective of an upper limit of travel of said window covering.

25. The assembly of claim 19, wherein the first position input is configured to receive pulses from a sensor while the window covering is moving.

26. The assembly of claim 25, wherein said executable code includes:

code to keep track of lapsed time between successive sensor pulses, when said motor is energized, and code to turn off the motor, if a sensor pulse is not received within a predetermined time period, while said motor is energized.

27. The assembly of claim 26, wherein an optical sensor is connected to the first position input to create the sensor pulses in response to interruptions of a light beam.

28. The assembly of claim 19, wherein the microprocessor is configured to store information reflective of a last direction of travel of the window covering, and wherein said executable code includes:

code to check a direction register to determine the last direction of travel, in response to an actuation of said manual switch; and code to write information reflective of a most recent direction of travel into said direction register, at the end of said most recent direction of travel.

29. The assembly of claim 19, wherein said executable code includes:

code to determine whether the manual switch has been pushed while the motor is energized, and code to de-energize the motor, if said manual switch has been pushed.

30. The assembly of claim 19, wherein said executable code includes:

code to raise the window covering in response to a first manual control signal, stop the window covering from further rising in response to a second manual control signal, lower the window covering in response to a third manual control signal, and stop the window covering from further lowering in response to a fourth manual control signal, when said first, second, third and fourth manual control signals are created by four successive activations of said manual switch.

31. The assembly of claim 19, wherein said manual switch is a momentary contact switch mounted on the head rail.

32. The assembly of claim 19, further comprising:

a voltage circuit having an input connected to said at least one battery, said voltage circuit having at least first and second output voltage levels, said first output voltage level being connected to said voltage supply input of the microprocessor, and said second voltage level being selectively connected to said motor to provide power to drive said motor, upon output from said microprocessor of a motor drive signal in response to either a valid sensed remote control signal or a manual control signal, the second output voltage level being not greater than 12 volts.

33. The assembly of claim 19, wherein the microprocessor further comprises first and second brake outputs configured to prevent current from flowing through the motor, in the absence of a motor drive signal resulting from either a valid user-generated light signal or a manual control signal.

34. The assembly of claim 19, wherein the microprocessor is further provided with a channel-selection input configured to allow a user to select from among a plurality of sensed remote control signals which will energize the motor to operate the window covering.

35. The assembly of claim 19 wherein the microprocessor is configured to adjust a setting of an upper limit of travel so as prevent the motor from encountering a stall condition on a subsequent activation of the motor.

36. The assembly of claim 35, wherein the upper limit of travel is set after the window covering has risen and the motor has encountered a stall condition.

37. In a battery-powered remote-control motorized window treatment assembly having a window covering movable between a lowered position and a raised position, the assembly including:

a head rail;

a reversible dc motor disposed in the head rail and operatively coupled to the window covering;

at least one battery mounted in the head rail and configured to power the reversible dc motor;

a manual switch mounted on the head rail and configured to output a manual control signal when the manual switch is activated; and a remote control sensor configured to detect a user-generated wireless remote control signal and output a sensed remote control signal in response thereto;

the improvement comprising:

a microprocessor configured to respond to at least two different sensed remote control signals output by the remote control sensor in response to at least two different corresponding user-generated wireless remote control signals, the microprocessor further configured to cause the reversible dc motor to turn in a first direction in response to a first sensed remote control signal and turn in a second direction in response to a second sensed remote control signal which is different from the first sensed remote control signal, the microprocessor having associated therewith a memory storing executable code for controlling operation of the window covering, the microprocessor having a plurality of connections including:

a ground connection;

a voltage supply input;

a first position input configured to receive information reflective of either a movement or position of said window covering;

a manual signal input configured to receive said manual control signal from said manual switch;

a remote signal input configured to receive said sensed remote control signal from said remote control sensor; and first and second motor drive signal outputs, each motor drive signal output configured to output a motor drive signal to energize the motor to turn in one of two directions, in response to either a valid user-generated wireless remote control signal or a manual control signal.

38. The assembly of claim 37, wherein the microprocessor is configured to store position information reflective of a vertical position of said window covering; and wherein said executable code includes:

code to update said position information based on received sensor pulses;

code to compare said position information with a predetermined value; and code to de-energize said motor, if said position information corresponds to said predetermined value.

39. The assembly of claim 38, wherein said predetermined value is reflective of an upper limit of travel of said window covering.

40. The assembly of claim 37, wherein the first position input is configured to receive pulses from a sensor while the window covering is moving.

41. The assembly of claim 40, wherein said executable code includes:

code to keep track of lapsed time between successive sensor pulses, when said motor is energized, and code to turn off the motor, if a sensor pulse is not received within a predetermined time period, while said motor is energized.

42. The assembly of claim 41, wherein an optical sensor is connected to the first position input to create the sensor pulses in response to interruptions of a light beam.

43. The assembly of claim 37, wherein the microprocessor is configured to store information reflective of a last direction of travel of the window covering, and wherein said executable code includes:

code to check a direction register to determine the last direction of travel, in response to an actuation of said manual switch; and code to write information reflective of a most recent direction of travel into said direction register, at the end of said most recent direction of travel.

44. The assembly of claim 37, wherein said executable code includes:

code to determine whether the manual switch has been pushed while the motor is energized, and code to de-energize the motor, if said manual switch has been pushed.

45. The assembly of claim 37, wherein said executable code includes:

code to raise the window covering in response to a first manual control signal, stop the window covering from further rising in response to a second manual control signal, lower the window covering in response to a third manual control signal, and stop the window covering from further lowering in response to a fourth manual control signal, when said first, second, third and fourth manual control signals are created by four successive activations of said manual switch.

46. The assembly of claim 37, further comprising:

a voltage circuit having an input connected to said at least one battery, said voltage circuit having at least first and second output voltage levels, said first output voltage level being connected to said voltage supply input of the microprocessor, and said second voltage level being selectively connected to said motor to provide power to drive said motor, upon output from said microprocessor of a motor drive signal in response to either a valid sensed remote control signal or a manual control signal, the second output voltage level being not greater than 12 volts.

47. The assembly of claim 37, wherein the microprocessor further comprises first and second brake outputs configured to prevent current from flowing through the motor, in the absence of a motor drive signal resulting from either a valid user-generated light signal or a manual control signal.

48. The assembly of claim 37, wherein the microprocessor is further provided with a channel-selection input configured to allow a user to select from among a plurality of sensed remote control signals which will energize the motor to operate the window covering.

49. The assembly of claim 37 wherein the microprocessor is configured to adjust a setting of an upper limit of travel so as prevent the motor from encountering a stall condition on a subsequent activation of the motor.

50. The assembly of claim 49, wherein the upper limit of travel is set after the window covering has risen and the motor has encountered a stall condition.

51. A method of operating a battery-powered wireless remote control motorized window treatment assembly having a microprocessor therein, the method comprising:

waking up the microprocessor from a sleep state;

determining whether either a manual switch has been activated or a user-generated wireless remote control signal has been sensed;

if the manual switch has been activated, checking a last direction of travel of the window covering and moving the window covering in a direction opposite said last direction of travel;

if a user-generated wireless remote control signal has been sensed, moving the window covering in a direction determined solely on information present in said user-generated wireless remote control signal; and monitoring a position of said window covering, as the window covering moves.

52. The method according to claim 51, further comprising checking a current position of the window covering, before moving the window covering in response to either activation of a manual switch or sensing of a user-generated wireless remote control signal.

* * * * *